United States Patent
Aoyagi et al.

(10) Patent No.: US 7,817,080 B2
(45) Date of Patent: Oct. 19, 2010

(54) RANGING AND COMMUNICATION MULTIFUNCTION SYSTEM

(75) Inventors: Yasushi Aoyagi, Tokyo (JP); Kazutaka Kamimura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/874,415

(22) Filed: Oct. 18, 2007

(65) Prior Publication Data

US 2008/0304560 A1 Dec. 11, 2008

Related U.S. Application Data

(63) Continuation of application No. PCT/JP2006/308031, filed on Apr. 17, 2006.

(30) Foreign Application Priority Data

| Apr. 18, 2005 | (JP) | ............................. 2005-120111 |
| Feb. 7, 2006 | (JP) | ............................. 2006-029245 |
| Apr. 14, 2006 | (JP) | ............................. 2006-111599 |

(51) Int. Cl.
*G01S 13/86* (2006.01)
*G01S 13/88* (2006.01)
*G01S 13/10* (2006.01)
*G01S 13/00* (2006.01)

(52) U.S. Cl. ............................. 342/57; 342/52; 342/61; 342/89; 342/91; 342/94; 342/118; 342/134; 342/135; 342/175; 342/195

(58) Field of Classification Search .................. 342/27, 342/28, 52, 57, 58, 60, 118, 125, 134–145, 342/175, 189–197, 21, 29–51, 61, 82–103, 342/165–174; 381/110; 340/10.1–10.6
See application file for complete search history.

(56) References Cited

U.S. PATENT DOCUMENTS 2,910,683 A * 10/1959 Todd ............................. 342/50

(Continued)

FOREIGN PATENT DOCUMENTS

JP 2000-68895 3/2000

(Continued)

OTHER PUBLICATIONS

"Comparator/DAC Combinations Solve Data-Acquisition Problems", Maxim, Mar. 21, 2000, URL:http://www.maxim-ic.com/an647>, 13 pages.

*Primary Examiner*—Bernarr E Gregory
(74) *Attorney, Agent, or Firm*—Oblon, Spivak, McClelland, Maier & Neustadt, L.L.P.

(57) ABSTRACT

A ranging and communication multifunction system including a transmission unit and a receiving unit, and integrates two functions of ranging and communication in which the transmission unit includes a transmission circuit, a carrier wave modification device, and a transmission antenna. The receiving unit includes a receiving circuit, a wave detector, a low noise amplifier, and a receiving antenna, and a data modulation performed in the transmission circuit uses a PPM system. Thus, the receiving circuit provides a ranging circuit and a communication separately, so that the demodulation processing of ranging and communication can be performed in parallel.

12 Claims, 16 Drawing Sheets

U.S. PATENT DOCUMENTS

| | | | |
|---|---|---|---|
| 3,341,845 A * | 9/1967 | Deman | 342/44 |
| 3,359,554 A * | 12/1967 | Hoffmann-Heyden | 342/50 |
| 3,460,139 A * | 8/1969 | Rittenbach | 342/60 |
| 3,931,622 A * | 1/1976 | Freedman | 342/42 |
| 6,760,454 B1 * | 7/2004 | Shreve et al. | 381/110 |
| 2003/0102997 A1 | 6/2003 | Levin et al. | |
| 2004/0161064 A1 | 8/2004 | Brethour et al. | |
| 2004/0235499 A1 | 11/2004 | Tanaka et al. | |
| 2005/0068225 A1 | 3/2005 | Inoue et al. | |

FOREIGN PATENT DOCUMENTS

| | | |
|---|---|---|
| JP | 2003-174368 | 6/2003 |
| JP | 2004-258009 | 9/2004 |
| JP | 2005-98847 | 4/2005 |

\* cited by examiner

RANGING AND COMMUNICATION MULTIFUNCTION SYSTEM

TECHNICAL FIELD

The present invention relates to the technical field of ranging and communication multifunction systems.

BACKGROUND ART

With respect to range measurement using radio wave, that is, a radar function, many technologies have been disclosed so far. For example, radar and the like using a pulse monotonously and repeatedly transmitted as a range function are known.

In recent years, as a radio communication technology of a new concept, an UWB (Ultra Wideband) radio system which is an ultra wideband radio system using a band of several GHz has become the center of attention.

The UWB is an impulse radio system using an ultra short pulse wave having a pulse width of approximately nano seconds or less. Communications can be made by modulating information into the position, the phase, and the amplitude of the impulse.

The UWB radio system has features that, by measuring the time by which the impulse is transmitted and the time until the transmission wave is reflected on a predetermined physical object surface and is received again at a transmission source, the ranging between the predetermined physical object and the UWB wave transmission source can be highly accurately performed.

On the other hand, a device that simultaneously realizes a ranging function and a communication function is being developed, and for example, in Patent Document 1, both of these functions are realized in the same device. In Patent Document 1, when performing data communications using a radio communication device, to avoid interference with the other radio communication and the like, a communication range is decided by using the ranging function in advance, and based on this, a transmission output is decided.

Patent Document 1: Japanese Patent Application Laid-Open No. 2003-174368

DISCLOSURE OF THE INVENTION

Problem to be Solved by the Invention

However, in the conventional device that simultaneously realizes the ranging function and the communication function, the device having the ranging function and the device having the communication function have been separately prepared and combined. Alternatively, the device having both of these functions has been integrated, but these functions have not been simultaneously made usable, but have been separately used.

Hence, there has been a problem that it is difficult to make the device small-sized and lightweight. Further, since both these functions cannot be used simultaneously, for example, it has not been possible to realize more advanced use such as recognizing the movement of a communication partner during the communication.

In addition, since the frequency band used for the ranging function and the frequency band used for the communication function are different from each other, a problem has occurred that transmitter receiver functions are required, respectively.

Hence, the present invention has been made in view of these problems, and an object of the invention is to provide a ranging and communication multifunction system capable of integrating the ranging function and the communication function so as to be processable.

Device for Solving the Problem

A first aspect of the ranging and communication multifunction system of the present invention is a ranging and communication multifunction system, including: a signal generating device for generating a predetermined impulse signal; a carrier wave modulating device for generating a transmission signal by up-converting the impulse signal by a predetermined carrier wave; a transmission antenna that transmits the transmission signal, a receiving antenna that receives the transmission signal reflected by a physical object and arriving again; an amplifying device for amplifying a receiving signal received by the receiving antenna; a wave detecting device for detecting an impulse signal from the output of the amplifying device; and a receiving circuit that inputs the impulse signal detected by the wave detecting device and performs a predetermined processing, wherein the receiving circuit includes a ranging device and a communication device.

A second aspect of the invention is a ranging and communication multifunction system, wherein the receiving circuit can process the ranging device and the communication device in parallel.

A third aspect of the invention is a ranging and communication multifunction system, wherein the signal generating device generates a UWB baseband impulse of approximately 1 ns in pulse width.

A fourth aspect of the invention is a ranging and communication multifunction system, wherein the signal generating device modulates data by using a PPM (Pulse Position Modulation) impulse.

A fifth aspect of the invention is a ranging and communication multifunction system, wherein a pulse repetition cycle of the impulse signal is larger than a total sum of the maximum delay time from among time slots for the PPM and the minimum pulse repetition cycle of the signal generating device, and moreover, the maximum delay time of the time slot is smaller than the minimum pulse repetition cycle.

A sixth aspect of the invention is a ranging and communication multifunction system, wherein the signal generating device generates preamble signals including the predetermined number of pieces of impulse rows prior to the modulation of the data by the signal generating device.

A seventh aspect of the invention is a ranging and communication multifunction system, wherein the ranging device includes an analogue-digital converter and a plurality of range bins, and the amplitude of the impulse signal detected by the wave detecting device is converted into a digital value by the analogue-digital converter every predetermined timing, and is sampled in each predetermined range bin, and from among the sampling values of the range bins, a distance is calculated from the range bin which is the maximum.

An eighth aspect of the invention is a ranging and communication multifunction system, wherein the analogue-digital converter converts the amplitude of the impulse signal detected by the wave detecting device into discrete multiple-value data (multiple-bit digital signal).

A ninth aspect of the invention is a ranging and communication multifunction system, wherein the sampling by the ranging device is delayed and started by the delay time by the PPM, and is performed by shifting a timing in increments of a predetermined time width (offset) decided so as to supplement the resolution of the amplitude data accumulated in the range bin.

A tenth aspect of the invention is a ranging and communication multifunction system, wherein the communication device includes a high speed comparator and a DAC, and the impulse signal detected by the wave detecting device is compared with an output of the DAC by the high speed comparator so as to be binarized, thereby performing data demodulation.

An eleventh aspect of the invention is a ranging and communication multifunction system, wherein the communication device starts the data demodulation based on the preamble signal.

A twelfth aspect of the invention is a ranging and communication multifunction system, wherein the signal generating device makes consecutive two impulses into a pair, and performs the data modulation for the second impulse.

A thirteenth aspect of the invention is a ranging and communication multifunction system, wherein the first impulse from the consecutive two impulses is the second impulse of the adjacent pair of impulses or a pulse generated next to the second impulse.

A fourteenth aspect of the invention is a ranging and communication multifunction system, wherein the signal generating device generates the impulse signal, and at the same time, generates a trigger pulse to be transmitted to the ranging device.

A fifteenth aspect of the invention is a ranging and communication multifunction system, wherein the communication device detects a reflected wave of the transmission signal based on the distance calculated by the ranging device, and performs the data demodulation except for the reflected wave.

A sixteenth aspect of the invention is a ranging and communication multifunction system, wherein the communication device controls a threshold value of the high speed comparator so that rising intervals of the output from the high speed comparator become appropriate.

EFFECT OF THE INVENTION

As explained above, according to the present invention, the ranging function and the communication function are integrated so that a processable ranging and communication multifunction system can be provided. As a result, a communication partner can be detected by the ranging function, and at the same time, the communications with the partner can be started.

According to this invention, even when the communication partner moves during the communications, the movement of the communication partner can be immediately detected by the ranging function, and the communications with the partner can be appropriately processed.

Further, according to this invention, in terms of the power used for the ranging function, a kind of dithering effect (the power is subjected to frequency dispersion at random) can be obtained by the PPM for communications, and this can reduce an average value of the peak power as compared with the system in which the pulse is monotonously and repeatedly transmitted, and becomes an effective method for the UWB which is severe in spectrum mask (low in allowed power value).

Further, according to this invention, even when the minimum repetition cycle of a pulse generator is relatively long, the data modulation can be performed at a high speed.

Further, when the consecutive two impulses are made into one pair, and the data modulation is performed for the second impulse by the signal generating device of the present invention, the communication corresponding to a high speed data rate can be realized also in the impulse radar of the low repetition cycle. Besides, by modulating the impulse, a scramble effect of the radar pulse can be obtained, and as a result, an advantage is afforded that interference between the radar sensors can be reduced.

BRIEF DESCRIPTION OF THE DRAWINGS

FIG. 2A is a view showing an impulse by a basic cycle T, and FIG. 2B is a view showing the impulse generated further delayed by dT than the basic cycle T;

EXPLANATION OF REFERENCE NUMERALS

Figure 1:
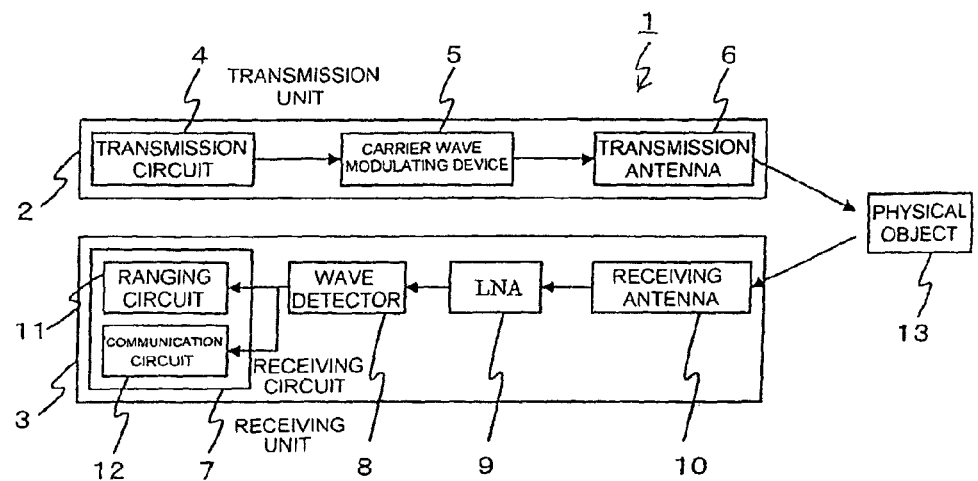
FIG. 1 is a block diagram showing the schematic configuration of a ranging and communication multifunction system according to one embodiment of the present invention.

1 . . . Ranging and communication multifunction system
2 . . . Transmission unit
3 . . . Receiving unit
4 . . . Transmission circuit
5 . . . Carrier wave modulation device
6 . . . Transmission antenna
7 . . . Receiving circuit
8 . . . Wave detector
9 . . . Low noise amplifier (LNA)
10 . . . Receiving antenna
11 . . . Ranging circuit
12 . . . Communication circuit
13 . . . Physical Object
21 . . . Timing setting device
22 . . . Analogue-digital converter
23, 23A . . . Range bin
24 . . . Distance detection device
31, 32 . . . Sampling clock
33 . . . Offset
41 . . . High speed comparator
42 . . . Calculation processor
43 . . . DAC
51 . . . Reference impulse
52 . . . Modulation impulse
53 . . . Cycle
54 . . . Serial data bit row
65 . . . Demodulation data
71 . . . Own station interfacial wave removal device
101 . . . Transmitter and receiver
102, 172 . . . Digital circuit unit
103 . . . Transmission circuit unit
104, 177 . . . Transmission antenna
105, 161 . . . Receiving circuit unit
106 . . . Receiving antenna
107, 175 . . . High frequency oscillator
108, 176 . . . Carrier signal
111 . . . Pulse generating unit
112, 132, 133, 174 . . . Mixer
113, 167 . . . Switch
121 . . . Pulse pattern
122, 173 . . . Impulse signal
123 . . . Pulse width
124 . . . Time intervals between Impulse signals
125 . . . Control signal
126 . . . Ratio of closed state of switch
127 . . . Isolation characteristics
131, 164 . . . IQ demodulator
134 . . . Phase adjusting unit
135, 136 . . . LPF
137, 138, 139, 140, 165, 166 . . . AD converter
141, 142 . . . Delay time setting unit
151 . . . Receiving signal
152 . . . I component
153 . . . Q component
154, 168 . . . Timing
162 . . . Radar demodulation unit
163 . . . Data demodulation unit
169 . . . Transmission signal

BEST MODE FOR CARRYING OUT THE INVENTION

A configuration of a ranging and communication multifunction system according to an exemplary embodiment of the present invention will be explained in detail with reference to the drawings. With respect to each component part having the same function, the same reference numeral will be attached and shown to simplify the illustration and the explanation thereof.

FIG. 1 is a block diagram showing the schematic configuration of a ranging and communication multifunction system according to one embodiment of the present invention. The ranging and communication multifunction system 1 of the present invention includes a transmission unit 2 and a receiving unit 3, and integrates two functions of ranging and communication. The transmission unit 2 includes a transmission circuit 4, a carrier wave modulation device 5, and a transmission antenna 6. The receiving unit 3 includes a receiving circuit 7, a wave detector 8, a low noise amplifier (LNA) 9, and a receiving antenna 10.

In the ranging and communication multifunction system 1, transmission and reception are performed by an ultra wide band impulse system. In the transmission circuit 4, a baseband impulse of approximately 0.5 to 1 ns is generated by a predetermined timing, and this impulse is up-converted by a predetermined high frequency band, for example, a carrier wave of 24 GHz in the carrier wave modulation device 5, and is transmitted from the transmission antenna 6.

On the other hand, the received signal received by the receiving antenna 10 is amplified by the low noise amplifier (LNA) 9, and is inputted to the wave detector 8, for example, a diode wave detector. The impulse signal detected by the wave detector 8 is subjected to the demodulation processing of the ranging and communication in the receiving circuit 7.

In the ranging and communication multifunction system 1, the demodulation processing of the ranging and communication is allowed to be performed in parallel (more specifically, the processing of the ranging and communication is simultaneously performed without switching to either one of them). To realize this processing, in the receiving circuit 7, a ranging circuit 11 and a communication circuit 12 are provided separately.

Figure 2:
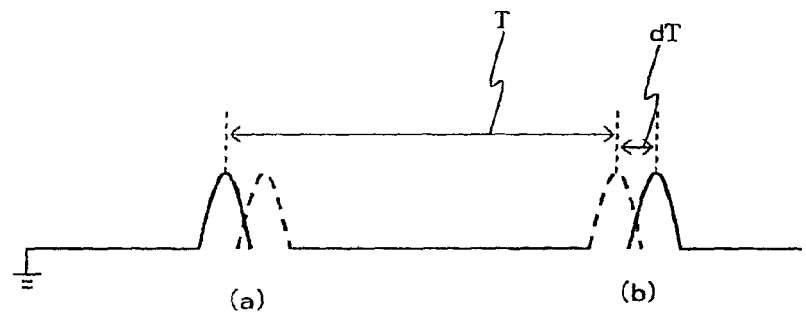
FIG. 2 is a view showing an example of the impulse signal generated by a PPM system.

The data modulation performed in the transmission circuit 4 is performed by using a PPM (Pulse Position Modulation) system. An example of the impulse signal generated by the PPM system is shown in FIG. 2. The impulse signal by the PPM system generates an impulse (a) by a predetermined basic cycle T or generates an impulse (b) with a delay by a minute time dT than the basic cycle T. Here, the minute time dT is a time sufficiently shorter than the basic cycle T.

The basic cycle T is larger than a sum of [the time slot dT for PPM (integral multiples of dT in the case of multiple values, in the case of a binary)] and [the minimum pulse repetition cycle] definable as signal generating device from the pulse transmission to the next pulse transmission.

The PPM system, as shown in FIG. 2, includes two types of an impulse (a) generated by the basic cycle T and an impulse (b) generated with a further delay by dT than the basics cycle T, and for example, "0" is allotted to the former impulse (a) and "1" is allotted to the latter impulse (b). In the transmission circuit 4, any of the impulse (a) or the impulse (b) is allotted according to the data modulated by the predetermined timing.

The impulse signal of the PPM system is not only a binary of "0" or "1" as shown in FIG. 2, but also can be multi-valued in dT unit. For example, when a digital code of double digits is transmitted, codes "00", "01", "10", and "11" are allotted with transmission timings n×T, n×T+dT, n×T+2×dT, n×T+3×dT, respectively, so that the codes can be multi-valued.

In this case, the maximum value of the time slot is 3 dT, and the basic cycle T at this time is larger than a sum of 3 dT and the minimum pulse repetition cycle, where $T \geqq \{3dT + [\text{the minimum pulse repetition cycle}]\}$ and $3 dT \ll T$.

When the communication circuit 12 is configured to recognize a preamble, at the communication data transmission time, prior to the communication data, the synchronization supplemental pulse is transmitted for the predetermined number of times by the cycle T.

Figure 3:
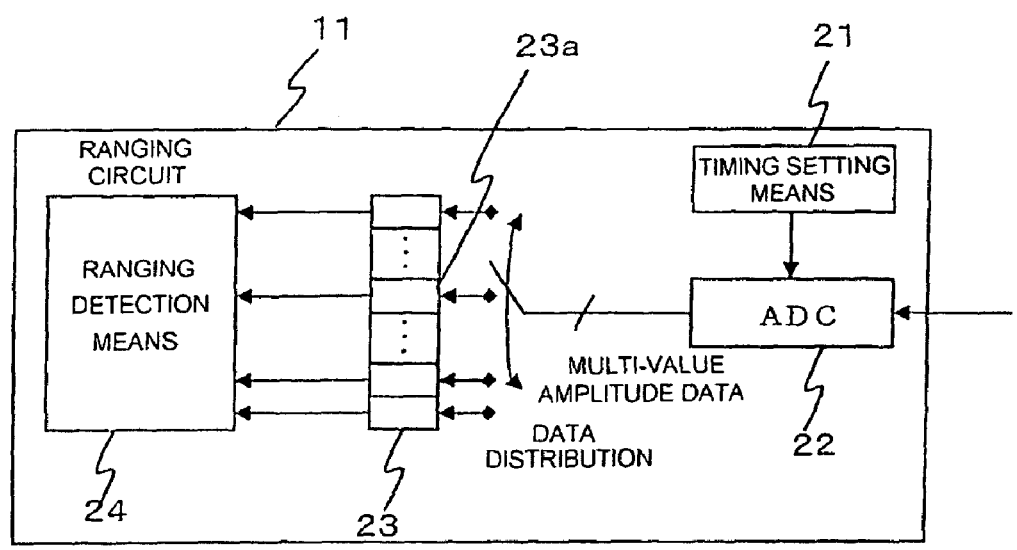
FIG. 3 is a block diagram showing one embodiment of a ranging circuit.

Next, the ranging circuit 11 will be explained below by using FIG. 3. In the ranging and communication multifunction system 1 of the present invention, the required time is detected before the impulse signal transmitted from the transmission unit 2 is reflected by an physical object 13 and is received by the receiving unit 3, and from the required time, the distance up to the physical object 13 is determined. FIG. 3 is a block diagram showing one embodiment of the ranging circuit, and includes a timing setting device 21, an analogue-digital converter (ADC) 22, a range bin 23, and a distance detection device 24.

The timing setting device 21 takes the time when the impulse is transmitted from the transmission unit 2 as 0, and outputs a clock signal to allow a sampling to be performed for an ADC 22 by a predetermined cycle. However, in the data modulation by the transmission circuit 4, when the delay of dT is added, the sampling starting time is delayed by dT. As a result, the effect of the PPM data modulation every pulse can be removed.

The ADC 22 inputs an impulse detection result from the wave detector 8 according to the clock signal outputted every sampling cycle from the timing setting device 21, and converts it from analogue to digital. The ADC 22 is a high speed wideband analogue-digital converter, and is required to include a baseband nearly equal to the baseband of the impulse generated by the transmission circuit 4 as far as the wideband is concerned.

The impulse detection result inputted from the ADC 22 from the wave detector 8 is an amplitude value of the received impulse, and this amplitude value is converted into a digital value by the ADC 22. The digital-converted amplitude value is a discrete multiple-value amplitude data (multiple-bit digital signal).

Figure 4:
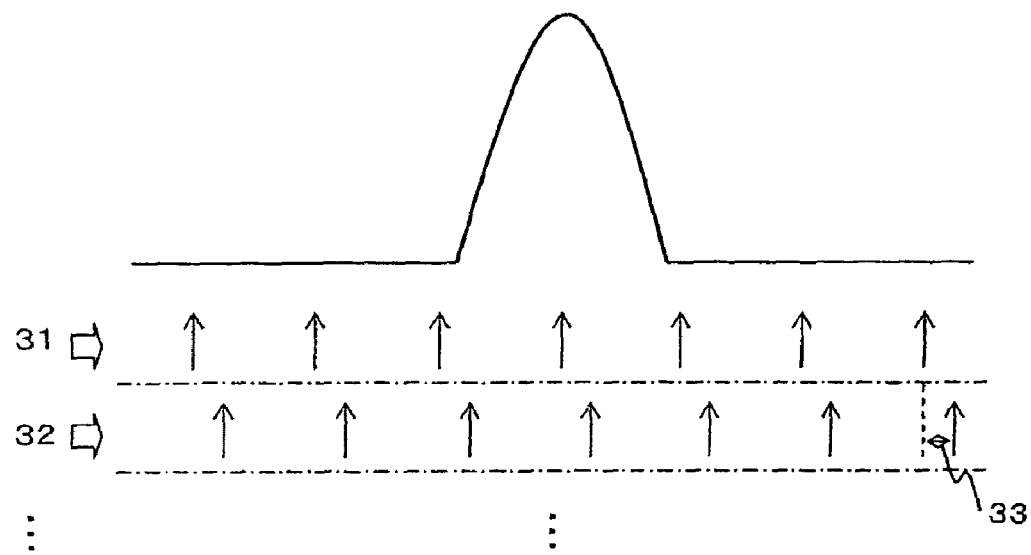
FIG. 4 is a view showing one embodiment for performing a sampling by adding an offset to a sampling clock.

When a sampling speed of the ADC 22 is not sufficient, the sampling clock set by the timing setting device 21 is added with a cyclic offset, so that an equivalent sampling can be performed. In FIG. 4, one embodiment is shown, in which a sampling is performed by adding the offset to the sampling clock.

In FIG. 4, as against a first sampling clock 31, in the second sampling clock, a clock 32 is further delayed by an offset portion 33 than the clock 31. Thereafter in the similar manner, a sampling is performed by delaying the sampling clock by the offset portion 33 for the predetermined number of times. As a result, even when the intervals of the sampling clock are made longer in consideration of the sampling speed of the ADC 22, the received impulse signal can be appropriately detected.

The range bin 23 is provided for the predetermined number of times in which the received impulse signal is sampled by the sampling cycle. The predetermined number of sampling times is decided such that a time length obtained by multiplying the sampling time by the sampling cycle corresponds to the maximum distance within a ranging range. When the sampling is started, the amplitude value digitalized by the ADC 22 is stored in sequence from the range bins at the leading head.

When a plurality of impulse signals are received and subjected to the ranging, every time a sampling of each impulse signal is started, the amplitude value is added in sequence from the leading head of the range bins. When the addition of the amplitude value is executed for the predetermined number of times, each added value of the amplitude values accumulated in each range bin 23 is divided by the predetermined number of times so as to calculate an average value of each range bin 23, and this average value is stored in the same range bin 23. The predetermined number of times in which the addition of the amplitude value is performed may be set separately every range bin 23.

As explained above, the amplitude value stored in each range bin 23 or the average value of the amplitude value is compared with a predetermined threshold value in the distance detection device 24, respectively, and when the amplitude value exceeding the threshold value or the average value of the amplitude values is detected, a distance is determined from the position of the detected range bin 23.

As another ranging method by the distance detection device 24, from among the amplitude values stored in the range bin 23 or the average value of the amplitude values, when a value exceeding the threshold value is detected (the range bin in question is taken as reference numeral 23a), from the amplitude value or a magnitude of the average value of the amplitude value, the distance up to the physical object 13 can be estimated. That is, as the distance up to the physical object 13 increases, the amplitude value or the average value of the amplitude value decreases, and it is, therefore, possible to estimate the distance up to the physical object 13a from the amplitude value or the average value of the amplitude value.

Hence, by comparing the distance up to the physical object 13a estimated from the position of the detected range bin 23a with the distance estimated from the amplitude value stored in the range bin 23a, the determination can be made as to whether or not the estimated distance is appropriate. When the estimated distance is determined appropriate, the distance higher in resolution is preferably used.

In the ranging and communication multifunction system 1 of the present invention, the position of the range bin 23a detected as explained above is transmitted to the communication circuit 12, and is used as basic data for synchronization establishment.

Figure 5:
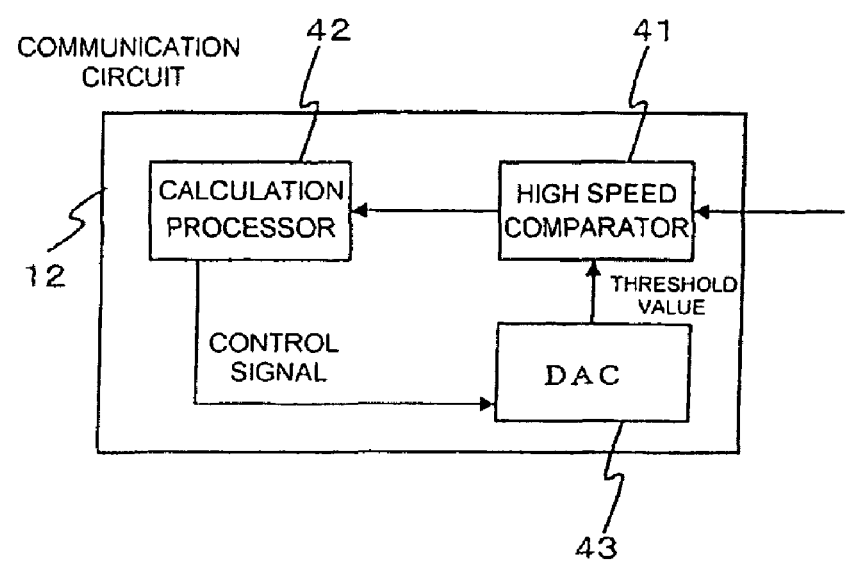
FIG. 5 is a block diagram showing a schematic configuration of a communication circuit.

Next, the communication circuit 12 will be explained below by using the drawing. FIG. 5 shows a schematic configuration of the communication circuit 12, which includes a high speed comparator 41, a calculation processor 42, and a DAC 43. The high speed comparator 41 directly inputs a receiving signal as an analogue value as it is, and by comparing this signal with the predetermined threshold value which is the output of the DAC 43, binarization of 1 or 0 is performed. The threshold value used here is variable by controlling the DAC 43, and can be easily changed by the calculation processor 42.

The communication includes a tracking decoding mode that performs synchronous detection by using a preamble signal and a sequential decoding mode that does not perform synchronous detection. Hereinafter, first, the sequential decoding mode that does not perform the synchronous detection will be explained, and after that, the tracking decoding mode that performs the synchronous detection will be explained.

Figure 6:
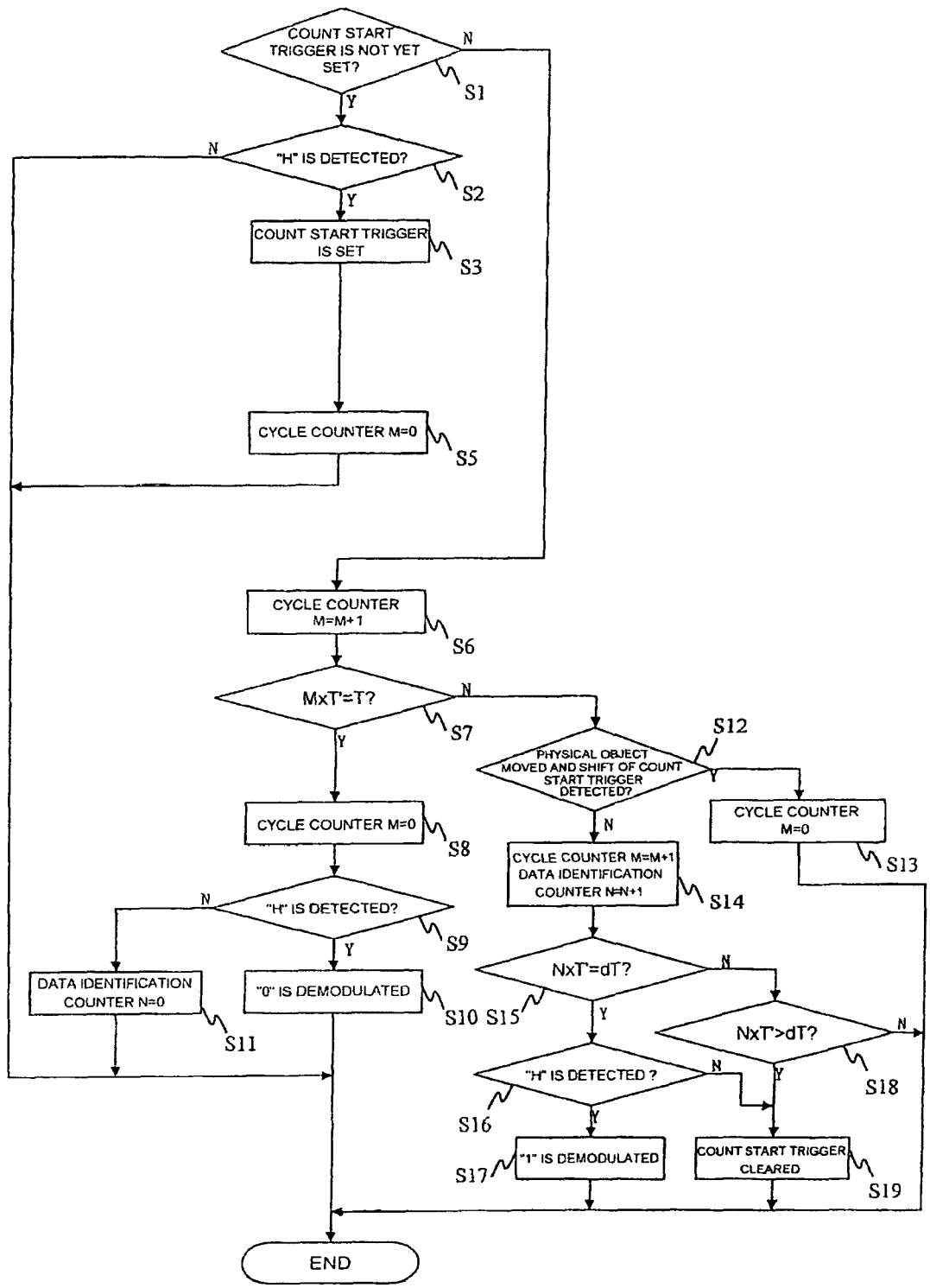
FIG. 6 is a view to explain the flow of a processing in a calculation processor of the communication circuit.

When the sequential decoding mode that does not perform the synchronous detection is used in the calculation processor 42, the processing as shown in FIG. 6 is performed by the predetermined cycle (taken as T') in the calculation processor 42. Hereinafter, a flow of the processing in the calculation processor 42 will be explained by using FIG. 6.

First, when the predetermined cycle T' is reached, at step S1, first, it is determined whether a [count start trigger] is already set. When the [count start trigger] is already set, the procedure advances to a processing of data modulation subsequent to step S6. On the other hand, when the [counter start trigger] is not yet set, the procedure advances to a setting processing of the [count start trigger] subsequent to step S2.

First, when the [count start trigger] is not yet set, at step S2, it is determined whether the binarized data (hereinafter, "1" shall be represented as "H", and "0" shall be represented as "L") inputted from the high speed comparator 41 is "H". When the binarized data is not "H", the processing is terminated, and the inputting of the next data is awaited.

When "H" is inputted, at step S3, the pulse rising timing at this time is stored as [the count start trigger].

At step S5, by initializing a [cycle counter] (hereinafter, represented as M) to 0, the count is started. The count here is executed every time every cycle T' at step S6.

When the [count start trigger] is already set, first, at step S6, the [cycle counter] M is added with 1, and a count is started.

Subsequently at step S7, it is determined whether the count value M is the number of times equivalent to the cycle T. That is, it is determined whether M×T'=T is established, and when established, the procedure advances to step S8, and when not established, the procedure advances to step S12.

At step S8, the [cycle counter] M is again initialized to 0. This is for the purpose of terminating the sampling of one cycle T portion and starting the sampling of the next cycle.

At step S9, it is determined whether the binarized data inputted from the high speed comparator 41 is "H". When the input data is "H", at the next step S10, "0" is demodulated as received data.

On the other hand, at step S9, when it is determined that the input data is not "H", at step S11, a [data identification counter] (hereinafter, represented as N) is initialized to 0. This is set for sampling the impulse subsequent to dT, that is, sampling the PPM signal of FIG. 2B.

Next, at step S7, when M×T'=T is not established, at step S12, first, the movement of a communication partner, that is, the physical object 13 is detected, and moreover, it is determined whether the count start trigger has caused a fluctuation of the small range smaller than dT.

When the determination at step S12 is established (Y), at step S13, the [cycle counter] M is reset (initialized to 0) and terminated. When the determination at step S12 is not established (N), the procedure advances to the processing subsequent to step S14, and performs the sampling processing of the PPM signal shown in FIG. 2B.

At step S14, the [cycle counter] M and the [data identification counter] N are counted, respectively. At step S15, it is determined whether the [data identification counter] N is the number of times equivalent to the time of dT. That is, it is determined whether M×T'=dT is established.

At step S15, when the determination is established, at the next step S16, it is determined whether the input data from the high speed comparator 41 is "H". When the input data is "H", at step S17, "1" is demodulated as the receiving data. When the input data is not "H", it is determined that the PPM signal shown in FIG. 2B is not detected, and at step S19, the [count start trigger] is cleared.

On the other hand, at step S15, when the determination is not established, at step S18, it is determined whether the sampling time passes over dT, and when passing over, at step S19, the [count start trigger] is cleared. When the [count start trigger] is cleared, again at step S2, the input from the high speed comparator 41 is set to "H", and at step S3, the setting of the [count start trigger] is awaited.

A flow of the processing in the calculation processor 42 will be explained by using FIG. 7 regarding a tracking decoding mode that performs the synchronous detection by using a preamplifier signal as a communication system.

Figure 7:
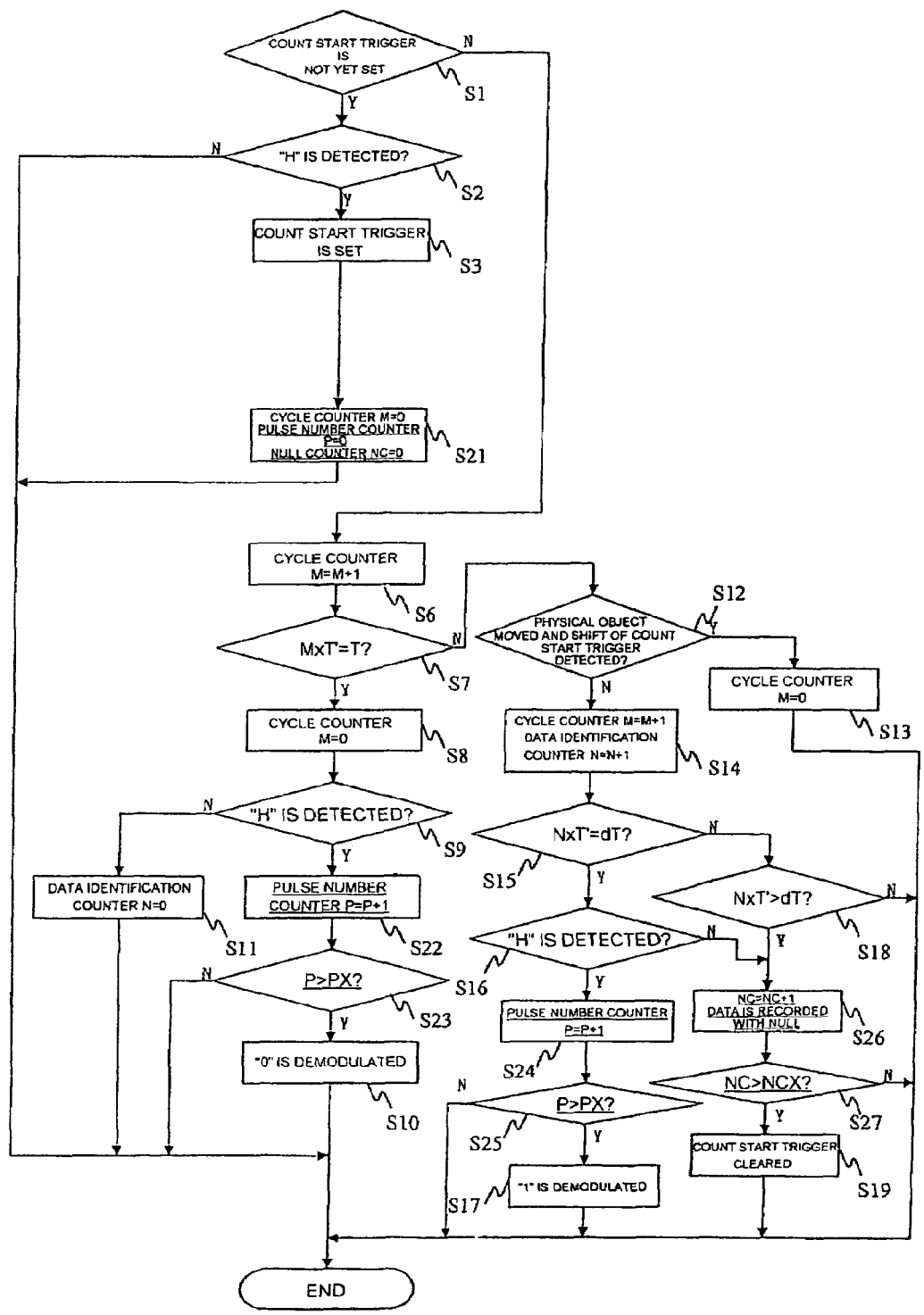
FIG. 7 is a view to explain the flow of another processing in the calculation processor of the communication circuit.

While the flow of the processing shown in FIG. 7 is basically the same as the flow of the processing of FIG. 6, in the present communication system, since the synchronous detection is performed at the receiving side, the preamble is employed. When the preamble is employed, in case it is confirmed that a predetermined signal is received more than the predetermined number of times, it is determined that the synchronization is established.

In the case of the present communication system, after the synchronization is established, even when the data exceeding T+dT is not detected, the resetting of the cycle counter and the like are not performed promptly, but " " (NULL) is recorded as data, and the synchronization is held. Only after the recording of NULL continues for the predetermined number of times, it is determined that the synchronization is out of step.

The present communication system based on FIG. 7 will be explained below with a focus on the difference from the sequential decoding mode that does not perform the synchronous detection of FIG. 6.

In the processing subsequent to step S2 in which the setting of the counter start trigger is performed, in replacement of step S5, the processing of step S21 is performed. That is, in addition to the start (initialization) of the cycle counter, the pulse number counter (represented as P) and a NULL counter (represented as NC) are started (initialized). The pulse number counter is for counting the signals of the preamble, and the NULL counter is for counting the number of recording times of the NULL.

At step S7, when the cycle counter M is the number of times equivalent to the cycle T, and at step S9, when it is determined that "H" is detected, at step S22, the pulse number counter continues adding, and at step S23, when the pulse number counter exceeds the predetermined number of times (represented as PX), "0" is demodulated as the received data.

Likewise, at step S15, when the data identification counter N is the number of times equivalent to dT, and at step S16, when it is determined that "H" is detected, at step S24, the pulse number counter continues adding, and at step S25, when the pulse counter exceeds the predetermined number of times (PX), "1" is demodulated at the received data.

At step S18, when the data identification counter N exceeds the number of times equivalent to dT and the data is not detected, the NULL counter continues adding, and at the same time, " " (NULL) is recorded as data. At step S27, when it is determined that the NULL counter exceeds the predetermined number of times (represented as NCX), at step S19, the count start trigger is cleared.

The ranging and communication multifunction system 1 of the present invention may be applied for the PPM system, so that the ranging function and the communication function are integrally provided. It is thus possible that the communication partner is detected by the ranging function, and the communication with the partner can be started at the same time.

When the communication partner moves during the communication, the movement of the communication partner can be immediately detected by the ranging function, thereby making it possible to appropriately process the communication.

Another embodiment of the processing in the calculation processor 24 will be explained below for using the sequential demodulation mode not performing the synchronous detection. The present embodiment allows the data demodulation to be performed only by the cycle counter M without using the data identification counter N. One example of the data demodulation by the present embodiment is shown in FIG. 8.

Figure 8:
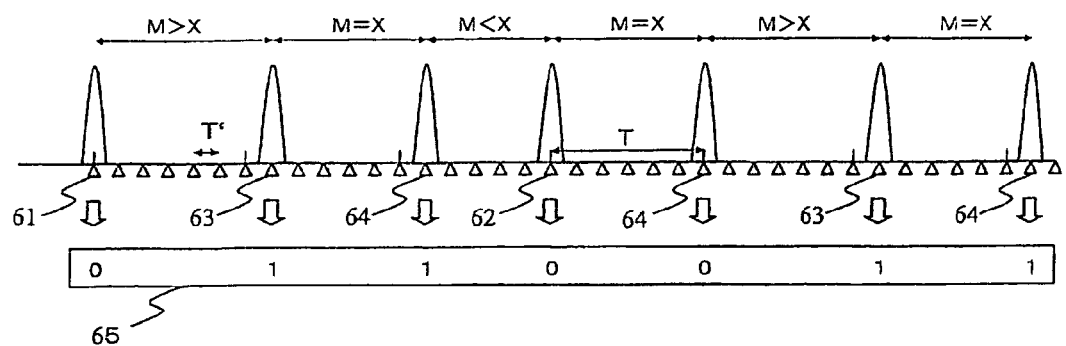
FIG. 8 is a view showing one example of data demodulation in another embodiment of the processing by the calculation processor to use the sequential demodulation mode.

In FIG. 8, a time point 61 when the output signal from the high speed comparator 41 is set to "H" is taken as a count start trigger, and from that point of the time, a count of the cycle counter M is started.

In the present embodiment, a count number X corresponding to the basic cycle T is used as a reference count number, and when a count number M during the period in which the input signal is set to "H" and is set to "H" again next time is smaller than the reference count number X (for example, a time point 62), a demodulated data 65 is taken as "0", and when the count number M is larger than the reference count number X (for example, a time point 63), a demodulated data 65 is taken as "1". When the count number M matches the reference counter number X (for example, a time point 64), the demodulated data 65 is taken as the same value as before.

In the present embodiment, when the communication data of the same value is continuously received, the same value as that of the previous time is demodulated. When the input signal of the same value (for example, "0") continues for a long period of time, in case the high speed comparator 41 continuously inputs a different value (for example, "1") next time, there is a possibility of a failure in the determination of the initial value (for example, determined as "0"). In the present embodiment, when the determination of the initial value fails, the signal of the subsequent same value is continuously demodulated to the value whose determination fails (for example, determined as "0").

Hence, for example, when the communication data processed in the transmission circuit 4 is 8 bit, by using an 8B10B system, the 8 bit can be converted into the transmission signal of 10 bit and outputted, so that the transmission signal of the same value is not generated in the transmission circuit 4 for a long period of time.

Examples of the signal conversion by the 8B10B system are shown in Table 1.

TABLE 1

Examples of the signal conversion by the 8B10B system

| Hexadecimal Number | Binary Number | After conversion to 10-bit |
|---|---|---|
| 00 | 0000 0000 | 100111 0100 |
| 01 | 0000 0001 | 011101 0100 |
| 02 | 0000 0010 | 101101 0100 |
| 03 | 0000 0011 | 110001 1011 |
| 04 | 0000 0100 | 110101 0100 |
| 05 | 0000 0101 | 101001 1011 |
| 06 | 0000 0110 | 011001 1011 |
| 07 | 0000 0111 | 111000 1011 |
| 08 | 0000 1000 | 111001 0100 |
| 09 | 0000 1001 | 100101 1011 |
| 0A | 0000 1010 | 010101 1011 |
| 0B | 0000 1011 | 110100 1011 |
| 0C | 0000 1100 | 001101 1011 |
| 0D | 0000 1101 | 101100 1011 |
| 0E | 0000 1110 | 011100 1011 |
| 0F | 0000 1111 | 010111 0100 |
| 10 | 0001 0000 | 011011 0100 |
| 11 | 0001 0001 | 100011 1011 |

Figure 9:
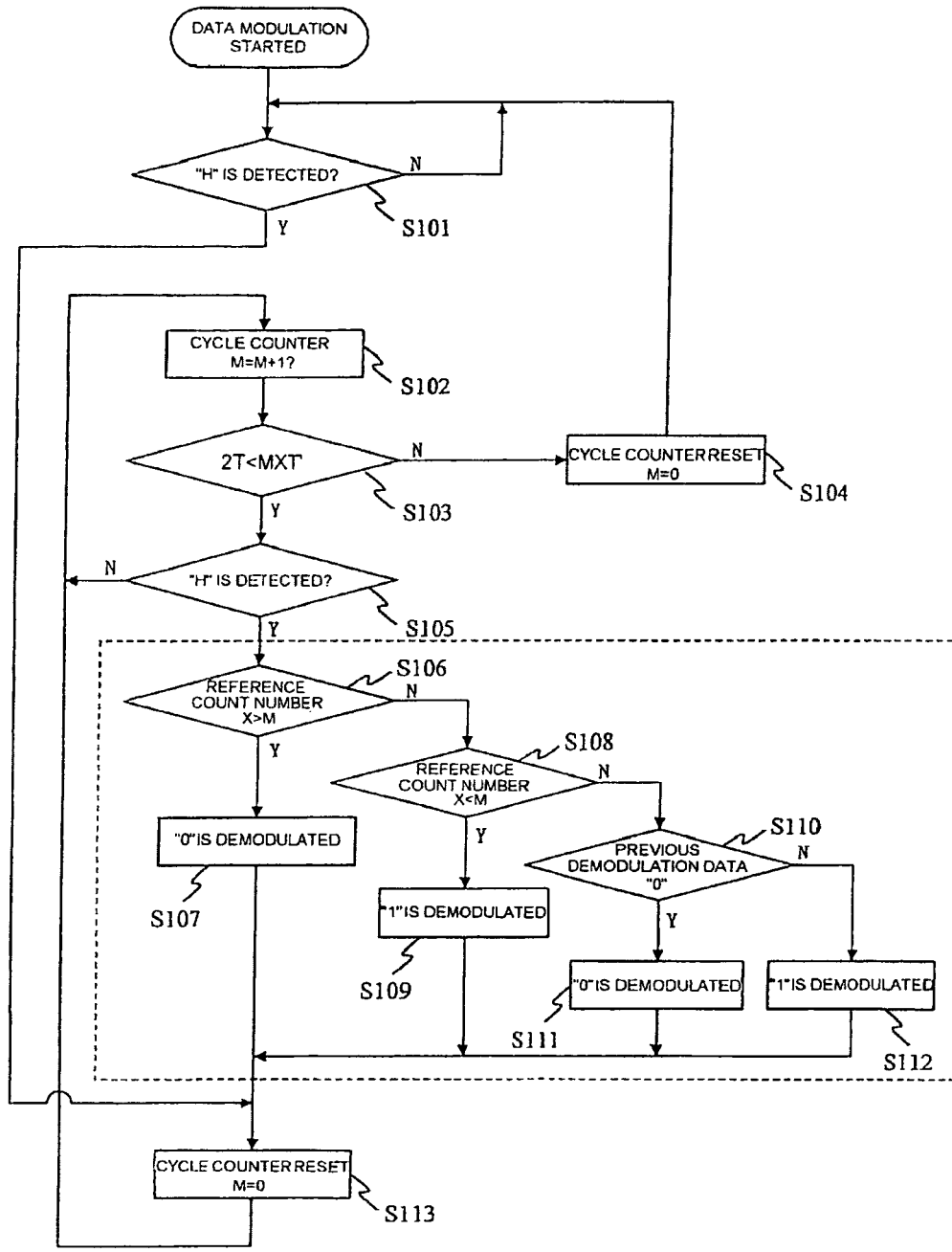
FIG. 9 is a view showing another embodiment of the flow of the processing in the calculation processor to use the sequential demodulation mode.

A flow of the processing of the calculation processor 42 in the present embodiment will be shown in FIG. 9. When the processing of the data demodulation is started in the calculation processor 42, first, at step S101, at the beginning, the setting of the output signal from the high speed comparator 41 to "H" is continuously awaited. At step S101, after detecting the "H", to start the count of the cycle counter M, at step S113, the cycle counter M is reset and terminated. In the subsequent processing cycle T', the processing is started from step S102.

At step S102, first, the cycle counter M is counted, and at step S103, it is determined whether a predetermined time 2T was exceeded without the impulse signal detected. As a result, when determined that the predetermined time 2T was exceeded, at step S104, the cycle counter M is rest, and after that, in the subsequent processing cycle T', the processing of step S101 is started again.

When it is determined that the predetermined time 2T is not exceeded by the determination of step S103, next, at the step S105, it is determined whether "H" is detected, and when determined that "H" is not detected, the processing is terminated, and the next processing cycle T' is awaited. On the other hand, at step S105, when determined that "H" is detected, subsequent to step S106, the data demodulation is performed.

First, at step S106, when it is determined that the cycle counter M is smaller than the reference count number X, at step S107, "0" is demodulated. At step S108, when it is determined that the cycle counter M is larger than the reference count number X, at step S109, "1" is demodulated. At step S108, when it is determined that the cycle counter M is equal to the reference count number X, at step Sill or S112, the same value as that of the previous time is demodulated.

At steps S106 to S112, when the data demodulation is terminated at step S113, the cycle counter M is reset and terminated. At step S13, when the cycle counter M is reset and terminated, in the next processing cycle T', the processing is started from step S102.

Figure 10:
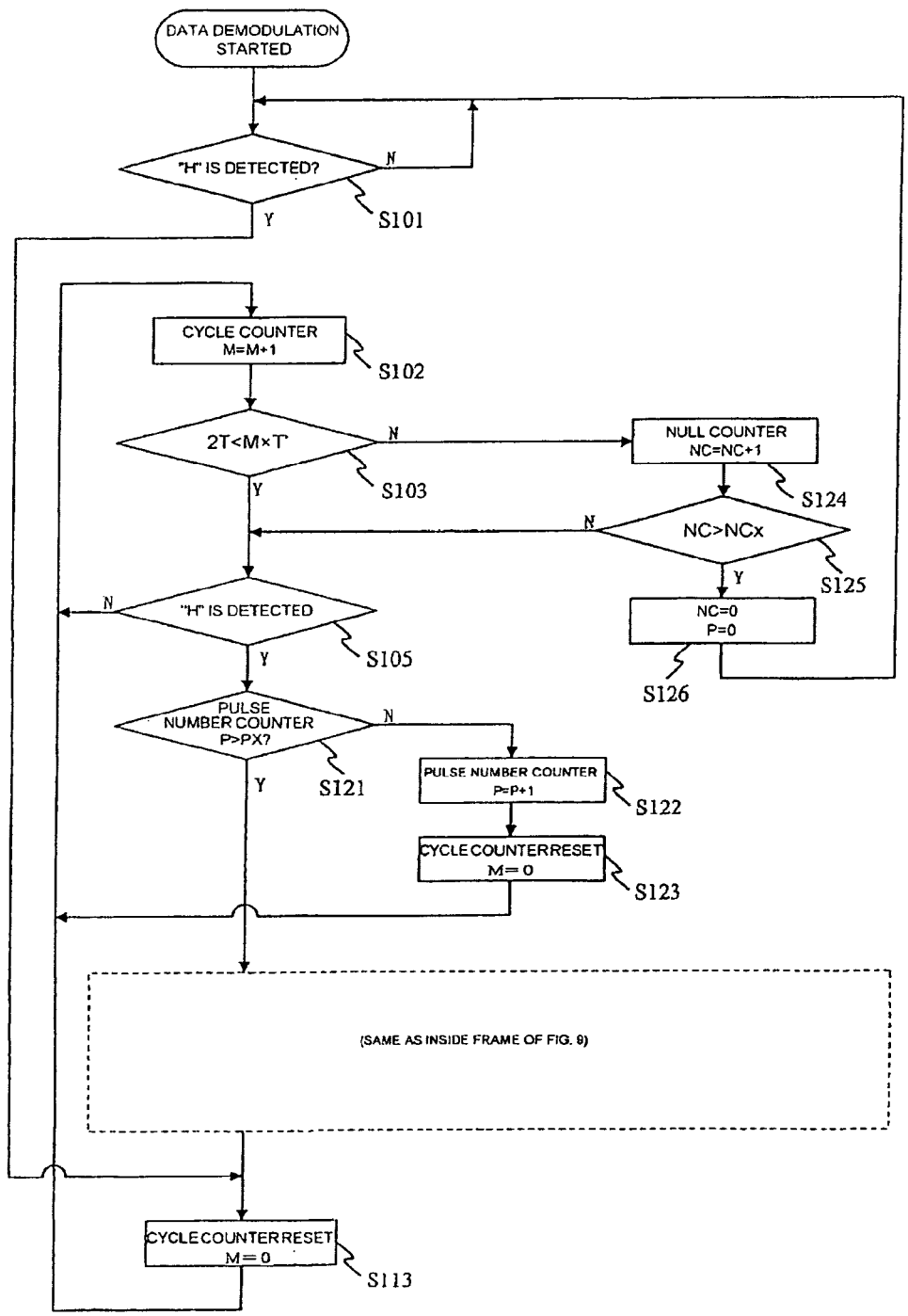
FIG. 10 is a view showing another embodiment of the flow of the processing in the calculation processor to use a tracking demodulation mode.

Next, another embodiment of the processing in the calculation processor 42 will be explained by using FIG. 10 regarding the tracking decoding mode that performs synchronous detection by using a preamble signal. In the present embodiment also, similarly to the embodiment shown in FIG. 7, when an impulse signal is not detected within a predetermined time, a NULL is recorded, and when the recording of the NULL continues for the predetermined number of times, it is determined that the synchronization is out of step.

Hereinafter, the processing only that is different from the tracking decoding mode shown in FIG. 9 will be explained. At step S105, when it is determined that "H" is detected; at step S121, until it is determined that a pulse number counter P exceeds the predetermined number times PX, the demodulation of the data is not performed, but the count of a pulse number counter P at step S122 and the resetting of the cycle counter M at step S123 are performed alone. At step S121, when it is determined that the pulse number counter P exceeds the predetermined number of times PX, subsequent to step S106, the data demodulation is performed.

At step S103, when it is determined that the predetermined time 2T was exceeded without the impulse signal detected, at step S124, the NULL counter NC is counted, and at step S125, until it is determined that the NULL counter NC has exceeded the predetermined number of times NCX, the processing subsequent to step S105 is continued. At step S125, when it is determined that the NULL counter NC has exceeded the predetermined number of times, at step S126, the NULL counter NC and the pulse number counter P are reset, and after that, in the subsequent processing cycle T', the processing is started again from the processing of step S101.

Figure 11:
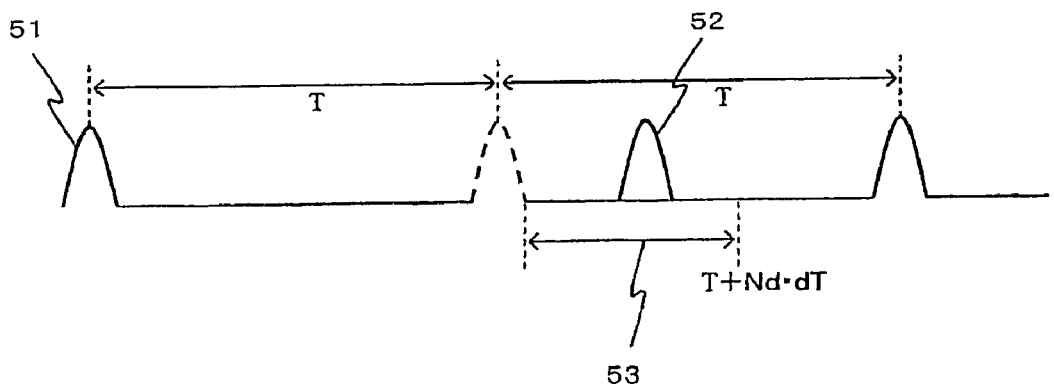
FIG. 11 is a view showing one embodiment of the data demodulation performed in the transmission circuit of another embodiment.

Another embodiment of the present invention will be explained below based on FIG. 11. In the present embodiment, as a communication system, consecutive two impulses are made into a pair, and for the second impulse, the data modulation is performed by a PPM system. FIG. 11 is a view showing one embodiment of the data modulation performed in a transmission circuit 4.

Similarly to the first embodiment, in the present embodiment also, an impulse of approximately 0.5 to 1 ns in pulse width is transmitted by a predetermined pulse repetition frequency (PRF). Further, with two impulses made into a pair, the data modulation is performed, and in the following explanation, a first impulse 51 is referred to as a reference impulse, and a second impulse 52 is referred to as a modulation impulse.

Ranging device in the present embodiment will be explained below. The ranging device of the present embodiment is an impulse type radar, which measures the time from when the reference impulse 51 or the modulation impulse 52 is transmitted until a reflection wave reflected by an physical object is received, thereby finding the distance up to the physical object.

To detect a distance up to the physical object in the ranging circuit 11, it is necessary to know the time on which the impulse is transmitted from the transmission unit 2, and in the present embodiment, simultaneously with respective transmissions of the reference impulse 51 and the modulation impulse 52, the trigger pulse is outputted to the ranging circuit 11. The trigger pulse is generated simultaneously with the generation of the reference impulse 51 or the modulation impulse 52 in the transmission circuit 4, and can be outputted to the ranging circuit 11 by the predetermined timing.

In the ranging circuit 11, with the trigger pulse inputted from the transmission unit 2 taken as the basis for reference, a time until the reflected wave of the reference impulse 51 or the modulation impulse 52 is received is determined. Needless to mention as explained above, the method for ranging by using the trigger pulse can be also applied to the first embodiment.

Similarly to the first embodiment, the ranging circuit 11 is an active receiving circuit that controls a clock by the timing setting device 21 and performs an integral action every range bin 23. As the communication system, two pulses are made into a pair so as to perform data modulation, while as the ranging device, the two impulses are processed separately, which is equivalent to the integration performed twice in the range bin 23.

In the present embodiment, the ranging function is given top priority, and the reduction of the detection range by the ranging function in order to add the communication function is kept to the minimum. That is, the expansion of the detection range necessitates the increase in the number of integration in the range bin 23, while the increase in the number of symbols (code) used for communication necessitates the enlargement of intervals between the impulses. When the intervals between the impulses are enlarged to enhance the communication function, it results in the decrease of the number of integration in the range bin 23 within the predetermined time.

Hence, in the present embodiment, the decision on the intervals between the impulses is given top priority so that the number of integration at the range bin 23 can be obtained as much as required. However, the range in which the communication is established can be set independently from the detection range of the ranging function.

Incidentally, though a sampling frequency of the ADC 22 varies depending upon the application, when it is desired that the number of integration is increased within a limited data renewal time and a detection distance and a detection object dynamic range are enlarged, an evaluation range bin for one pulse transmission must be subjected to parallel operation.

Next, the communication function in the present embodiment will be explained below in detail.

The communication of the present embodiment is premised on a connection-less type that does not ever face another vehicle having a transmission unit, and does not receive the packets such as ACK, NACK, and the like. The communication of the present embodiment performs the transmission in the form of broadcasting the information on its own vehicle, and another vehicle having received the information is supposed to decide its action based on the information. These premises are the same also in the case of the first embodiment.

In general, the communication requires a synchronization operation, and in the present embodiment, similarly to the first embodiment, a synchronization circuit and a tracking circuit are not particularly provided, and an employed system can decipher the data from the pulse obtained one after another.

It is never known when the communication wave arrives, and besides, the operation clock between transmission and reception is non-synchronous. Therefore, an error by clock offset and jitter must be corrected between transmission and reception. However, in the case of the connection-less type communication, such correction is difficult. Moreover, to hold the clock between the impulse and the impulse is difficult. Hence, in the present embodiment, instead of an active demodulation for making a search by clock, a passive demodulation for operating the received pulse as a trigger is employed.

Figure 12:
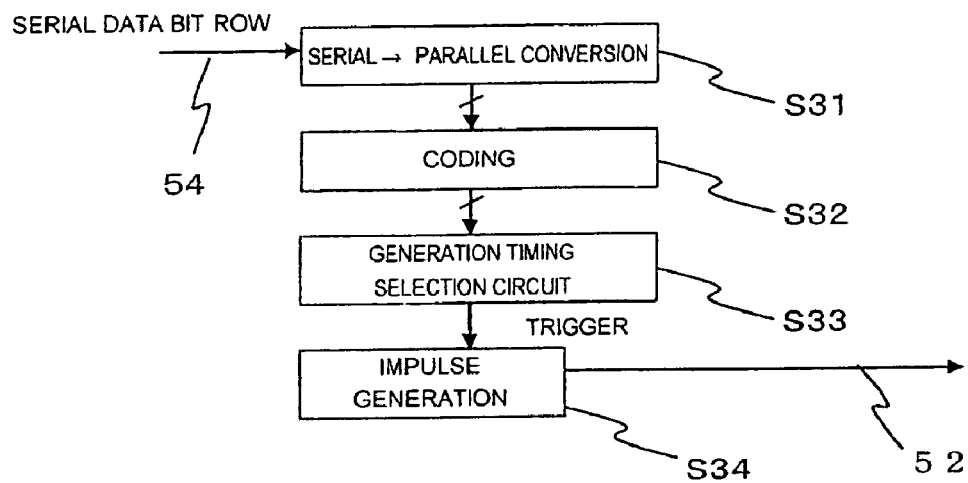
FIG. 12 is a flow chart showing an algorism for deciding a timing to transmit a modulation impulse in another embodiment.

The data modulation system of the present embodiment will be further explained below in detail by using FIG. 12. As shown in FIG. 11, when the reference impulse 51 is transmitted, after the predetermined time elapses from that time, the modulation impulse 52 is transmitted. FIG. 12 is a flow chart showing an algorism to decide a timing for transmitting this modulation impulse 52, which is executed in the transmission circuit 4.

A time from when the reference pulse 51 is transmitted till the modulation impulse 52 is transmitted is decided based on the data, that is, a serial data bit-row 54 shown in FIG. 12. At step S31, first, the serial data bit-row 54 is subjected to a parallel conversion, and at step S32, each bit is subjected to the parallel conversion, and is encoded.

At step S33, the data encoded at step S32 is inputted to a generation timing selection circuit, and decides a generation timing of the modulation impulse 52. Based on the generation timing decided at step S33, at step S34, the modulation impulse 52 is generated.

The generation timing of the modulation impulse 52 as explained above is within the range of a period 53 shown in FIG. 11 at least after the basic cycle T of the pulse repetition has elapsed, and corresponds to any of T, T+dT, T+2 dT, ... , T+Nd·dT, where dT (<<T) is a time slot for data modulation, and Nd is a transmission symbol (code). Further, Nd=2N (N; natural number), and when N=1, two types of position setting, and when N=2, four types of position setting (PPM) can be made.

As explained above, when two of the reference impulse 51 and the modulation impulse 52 are made into one pair and transmitted, after a time 2T from when the reference impulse 51 is transmitted, the reference impulse 51 is transmitted again. Hereinafter in the same manner, the reference impulse 51 and the modulation impulse 52 are alternately transmitted.

Incidentally, the reference impulse 51 can apparently perform an operation also as the immediately preceding modulation impulse 52, and moreover, by such information modulation, can realize the speeding up of the information speed, and can realize a peak reduction of the average value of power spectrum by reinforcing the randomness. In such case, since the transmission timing of the reference impulse 51 is changed by the data modulated by the immediately preceding modulation impulse 52, it does not become 2T. Although the fact does not change that the interval of the reference impulse 51 with the modulation impulse 52 correspond to any of T, T+dT, T+2 dT, ..., T+Nd·dT, the interval with the immediately preceding modulation impulse of the reference impulse 51 also correspond to any of T, T+dT, T+2 dT, ..., T+Nd·dT.

Figure 13:
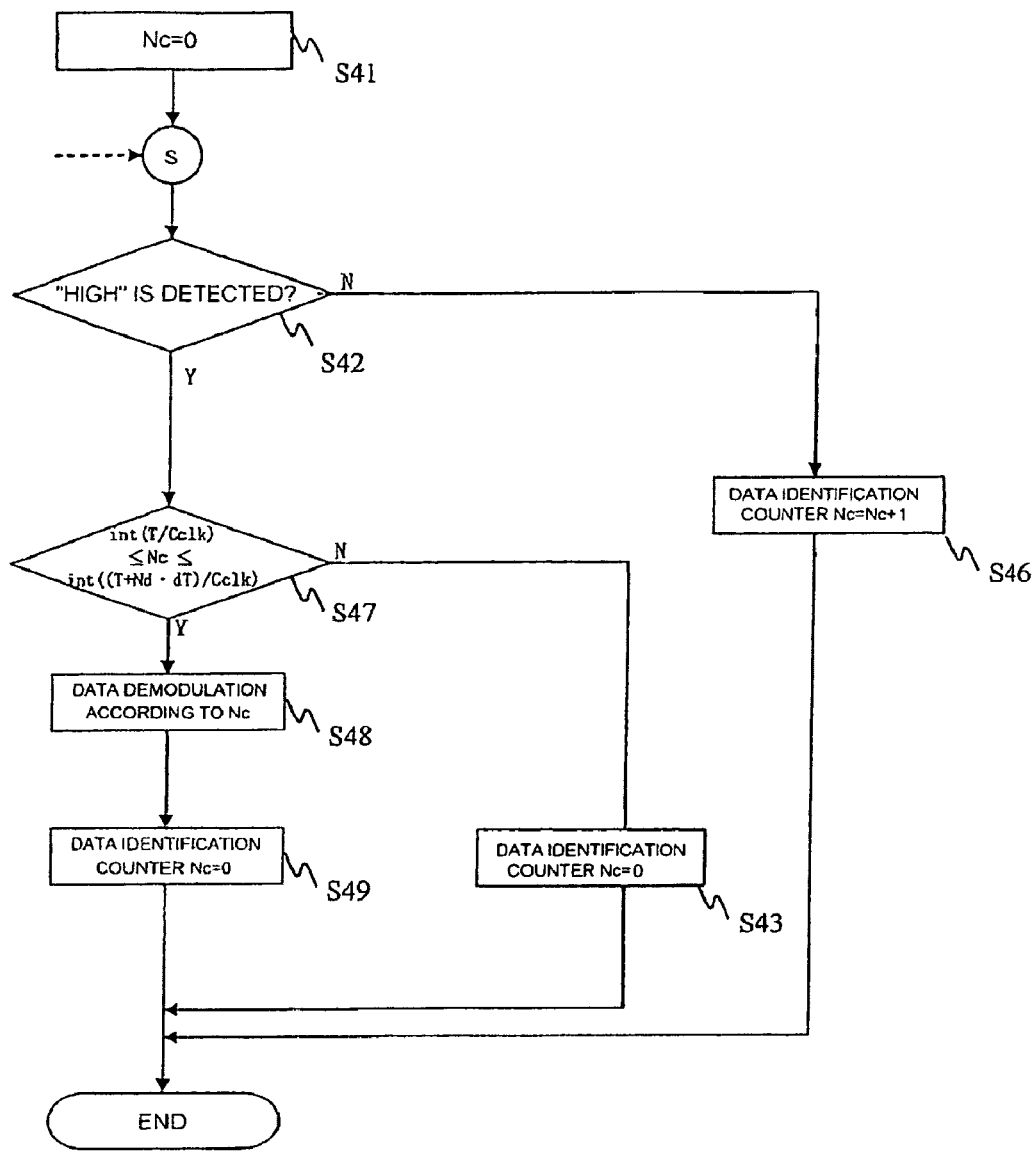
FIG. 13 is a view showing a flow of the processing performed in the calculation processor of the communication circuit of another embodiment.

Next, a communication receiving algorism of the present embodiment will be explained below in detail by using FIG. 13. FIG. 13 is a view showing a flow of the processing performed by a calculation processor 42 of the communication circuit 12.

In the present embodiment, it is necessary to detect whether the interval of the reference impulse 51 with the modulation impulse 52 is within the predetermined time interval. Hence, at step S41, first, a data identification counter Nc is set to 0.

At step S42, it is determined whether the output of the high speed comparator 41 is HIGH (or 1), and when HIGH, at step S47, it is determined whether the data identification counter Nc satisfies the following formula.

$$int(T/Cclk) \leq Nc - int\{(T+Nd \cdot dT)/Cclk\} \quad \text{(Formula 1)}$$

When the data identification counter Nc satisfies the above formula, it is determined that the modulation impulse 52 is received, and next, at step S48, the data demodulation processing corresponding to Nc is performed.

At step S49, the data identification counter Nc is set to 0.

The processing subsequent to the second processing starts from a point S shown in FIG. 13 every sampling cycle (cycle of the count) Cclk. Until HIGH is detected again at step S42, the data identification counter Nc continues adding every Cclk at step S46.

On the other hand, at step S42, when HIGH is detected again, next, the procedure advances to step S47.

At step S47, it is determined whether the data identification counter Nc satisfies the (formula 1). When the data identification counter Nc satisfies the (formula 1), it is determined that the modulation impulse 52 is received, and next, at step S48, the data demodulation processing according to Nc is performed.

At step S48, after the data demodulation is performed, at step S49, the data identification counter Nc is reset to 0, and the reception of the reference impulse is again awaited.

On the other hand, at step S47, when it is determined that the data identification counter Nc does not satisfy the (formula 1), it is determined that the impulse is not normal impulse, and only the setting of step S43 is performed.

By the flow of the processing shown in FIG. 13 as explained above, in the present embodiment also, the communication using the PPM impulse can be realized. By making the consecutive two impulses into one pair, and performing the data modulation for the second impulse, even the radar of the low repetition cycle can correspond to a high speed data rate.

When allowing the data modulation to be performed for any impulse of the modulation impulses, the reference impulse can correspond to much higher speed data by the same data modulation procedure.

By the modulation of the impulse by the PPM system, the scramble effect of a radar pulse is obtained, and as a result, an effect of being able to reduce the interference between radar sensors can be obtained.

When allowing the data modulation to be performed for any impulse of the modulation impulses, the reference impulse can obtain still further scramble effect of the radar pulse.

Incidentally, the maintenance time of HIGH when the impulse is received in the high speed comparator 41 can be adjusted by a predetermined circuit. Hence, for example, when the processing of the calculation processor 42 is slow, the maintenance time of HIGH is made longer, so that the processing of the calculation processing 42 can be made in time. As the predetermined circuit, for example, a low pass filter can be used. Alternatively, the circuit can be realized by changing the characteristics of the hysteresis and the like of the high speed comparator 41.

In the ranging and communication multifunction system 1 of the above explained embodiment, by detecting the time required from when a predetermined impulse signal transmitted from the transmission unit 2 is reflected by the physical object 13 until it is received by the receiving unit 3, the distance to the physical object 13 can be determined. The impulse signal (hereinafter, described as a reflected impulse signal) reflected by the physical object 13 and received by the receiving unit 3 is inputted not only to the ranging circuit 11, but also to the communication circuit 12. As a result, the reflected impulse signal is likely mixed with the communication signal.

Figure 14:
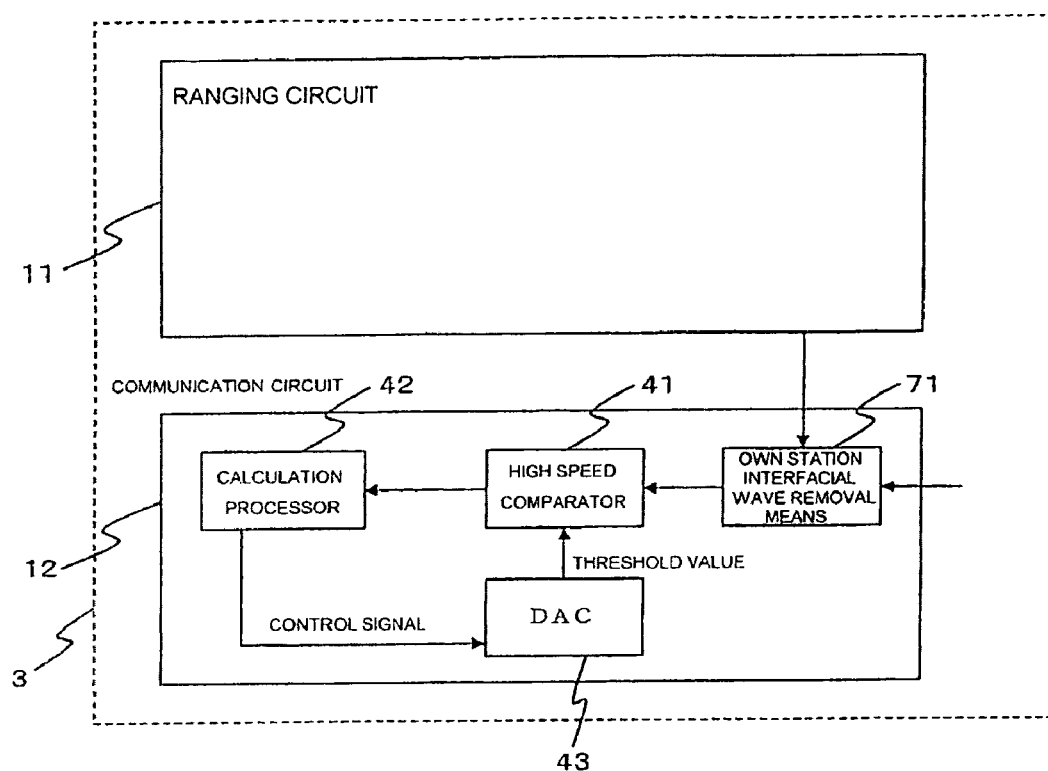
FIG. 14 is a view showing one embodiment in which a reflection impulse signal is removed in the communication circuit.

Hence, one embodiment will be shown in FIG. 14, in which the reflected impulse signal is removed from the processing in the communication circuit 12 so as not to be data-demodulated as a communication signal. In this embodiment, the communication circuit 12 is added with an own station interfacial wave removal device 71. The own station interfacial wave removal device 71 inputs a distance up to the physical object 13 from the ranging circuit 11, and estimates a receiving timing of the reflected impulse from the distance. The receiving timing is allowed to shut off the input toward the high speed comparator 41.

In the embodiment shown in FIG. 14, though the own station interfacial wave removal device 71 is provided at the input side of the high speed comparator 41, this may be provided at the output side of the high speed comparator 41. In this case, at the receiving timing of the reflected impulse, the output from the high speed comparator 41 can be shut off by the own station interfacial wave removal device 71 so as not to be inputted to the calculation processor 41.

On the other hand, the receiving antenna 10 is likely to receive communication signals from other stations also other than the physical object 13. Hence, the present embodiment is configured to be able to remove the interfacial waves from other stations by controlling the threshold value used in the high speed comparator 41. The control method of the threshold value for removing the interfacial waves from other stations will be explained below by using FIG. 5 or FIG. 14.

The high speed comparator 41 compares the receiving signal which is an analogue value with the threshold value inputted from the DAC 43 so as to perform a binarization processing. The threshold value can be easily changed by the calculation processor 42. Hence, to remove the interfacial waves from other stations, the threshold value can be controlled as follow in the calculation processor 42.

Figure 15:
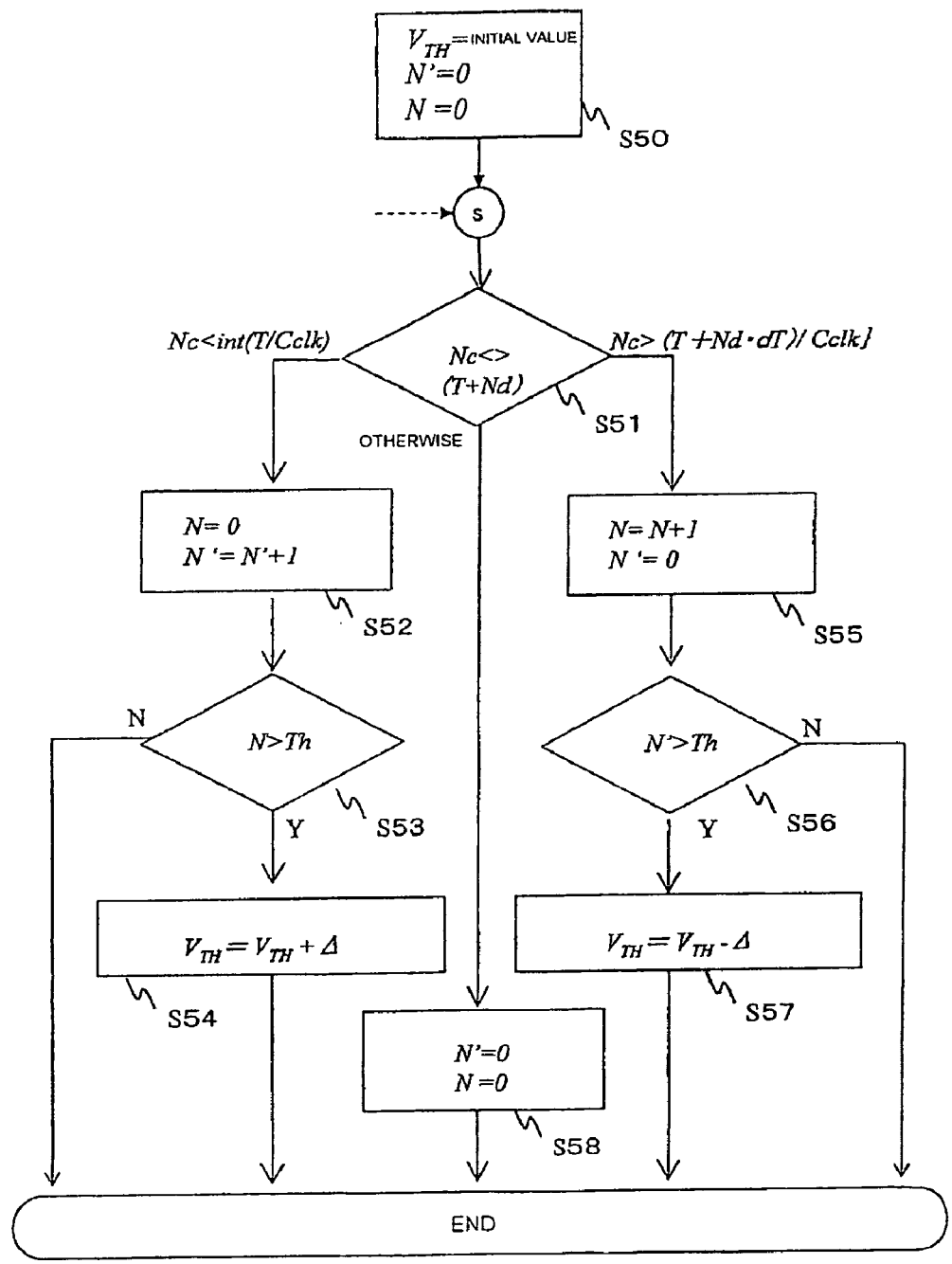
FIG. 15 is a flow chart showing a control algorism for removing interference.

The communication receiving algorism of the present embodiment will be described below in detail by using FIG. 15. FIG. 15 is a view showing a flow of the processing performed in the calculation processor 42. First, at step S50, at the beginning, an identification counter value N (counter which measures the number of times when the impulse intervals are too wide) and an identification counter value N' (counter which measures the number of times when the impulse intervals are too narrow) are set to 0. Further, the initial value of the data determination, that is, the setting value VTH of the DAC 43 is set with a predetermined initial value.

At steps S51 to S58, the timing by which the output rises from the high speed comparator 41 (becomes 1) is kept stored in the calculation processor 42, and the threshold value is controlled according to the interval of the rising timing.

That is, at step S51, when the intervals of the rising timing of the consecutive impulses, which take the data identification counter value Nc as a measurement value, are small as compared with the value int (T/Cclk) which divides the basic cycle T by the cycle Cclk of the count of the calculation processor 42, it is considered that the high speed comparator 41 is likely to be processing the interfacial waves from other stations, and so the procedure advances to the step S52, and the identification counter value N is set with 0, and at the same time, the identification counter value N' is added with 1.

At step S53, the identification counter value N' is compared with a predetermined value TH. As a result, when the counter value N' exceeds the predetermined value TH, it is determined that the high speed comparator 41 is processing the interfacial waves from other stations. In this case, at the step S54, the value VTH of the threshold value is made large by a predetermined value Δ so that the threshold value becomes larger than the amplitude of the interfacial waves of other stations, and is outputted to the DAC 43.

In contrast to this, when the data identification counter value Nc shows a sufficiently long period as compared with a sum of the basic cycle T and the data modulation time, that is, a value exceeding int{(T+Nd·dT)/Cclk}, it is determined that the value of the threshold value is likely to be too large, and the procedure advances to step S55, and the identification counter value N is set with 0, and at the same time, the identification counter value N' is added with 1.

At step S56, the identification counter value N is compared with the value TH. As a result, when the counter value N exceeds the predetermined value TH, it is determined that the high speed comparator 41 is processing the interfacial waves from other stations. In this case, at step S57, the value VTH of the threshold value is made smaller by a predetermined value Δ, and is outputted to the DAC 43.

In contrast to this, when the data identification counter value Nc is in a data-demodulatable range, that is, satisfies the formula 1, it is determined that appropriate said threshold value VTH is set to the DAC 43, and at step S58, the identification counters N and N' are set with 0.

As explained above, based on the intervals of the output rising timing of the high speed comparator 41, the threshold value is controlled, so that the interfacial waves of other stations can be appropriately removed.

The ranging and communication multifunction system of the present invention uses the impulse signal of an UWB which is an ultra wideband radio system using several GHz frequency band. The impulse signal of the UWB can be generated by using a high frequency oscillator, a wideband mixer, and the like. However, when the wideband mixer does not possess an isolation of a high performance, there has been a problem that the carrier signal of the high frequency oscillator leaks to the transmission antenna side through the mixer, and ends up being emitted from the transmission antenna.

Hereinafter, the transmission circuit and the receiving circuit having reduced the leakage of the carrier signal will be described. The transmission circuit and the receiving circuit relate to the impulse signal of the high frequency band including a bipolar pulse.

Figure 16:
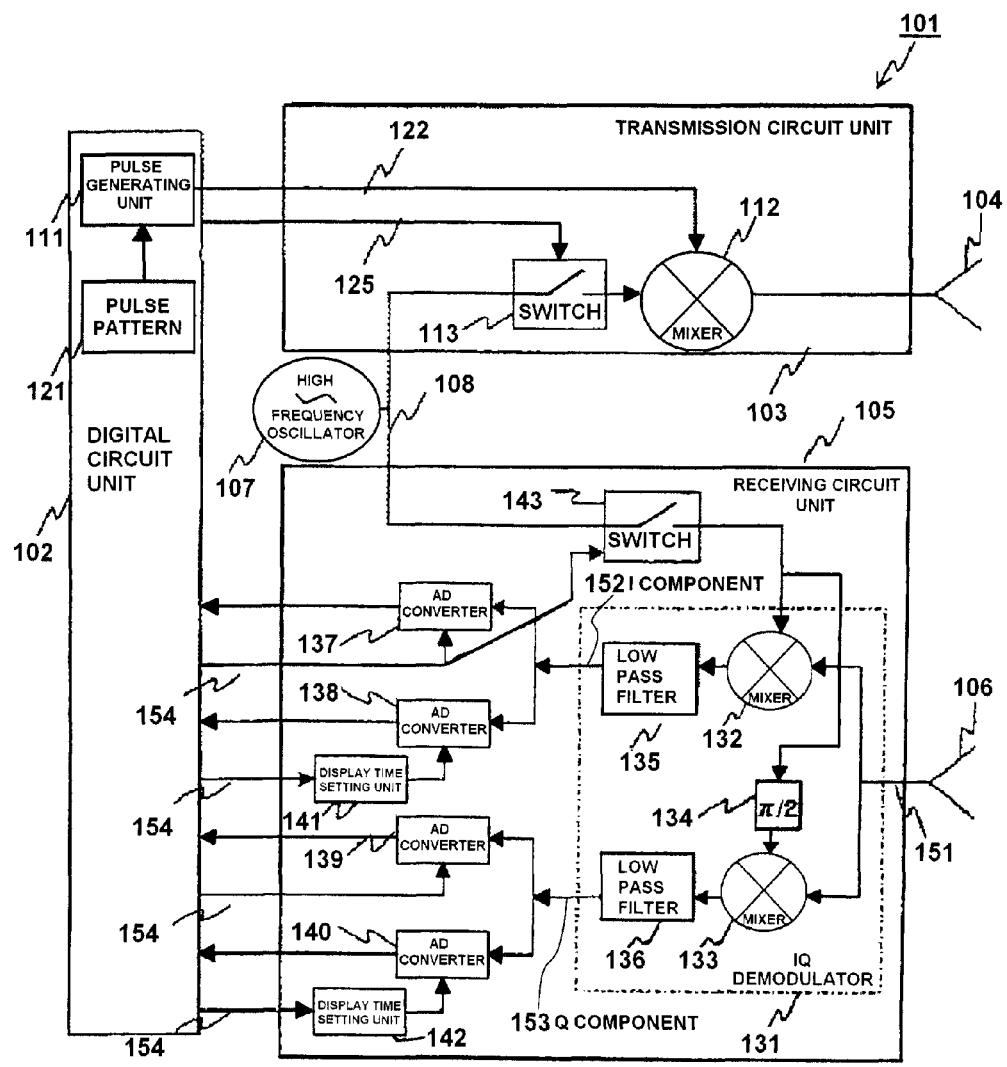
FIG. 16 is a schematic view showing a whole configuration of an example of a transmitter and receiver.

FIG. 16 is a schematic diagram showing the whole configuration of a transmitter and receiver 101. The transmitter and receiver 101 include a digital circuit unit 102, a transmission circuit unit 103, a transmission antenna 104, a receiving circuit unit 105, a receiving antenna 106, and a high frequency oscillator 107.

The digital circuit unit 102 performs the control and the signal processing, and the like of the transmission circuit unit 103 and the receiving circuit unit 105, and for example, can use a FPGA (Field Programmable Gate Array). The digital circuit unit 102 is provided inside with a pulse generating unit 111, which generates a pulse pattern 121 to generate the impulse signal of a predetermined width at the predetermined cycle, and provide it to the pulse generating unit 111.

Figure 17:
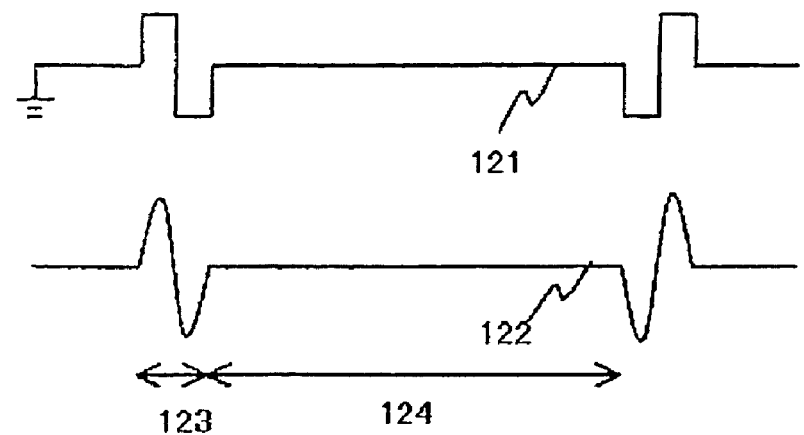
FIG. 17 shows one example of an impulse pattern 121 used in the pulse generating unit 111 and an impulse signal 122 generated in a pulse generating unit 111.

One embodiment each of the pulse pattern 121 used by the pulse generating unit 111 and an impulse pattern 122 generated by the pulse generating unit 111 will be shown in FIG. 17. To generate the impulse signal 122 from the pulse pattern 121, the pulse generating unit 111 can use, for example, a LVDS.

In FIG. 17, as the impulse signal 122, the bipolar pulse is used. The bipolar pulse has a waveform combining a convex pulse upward (peak) and a convex pulse downward (dip), and includes two types of the wave forms such as combining a dip behind a peak and combining a peak behind a dip.

The high frequency oscillator 107 transmits a carrier signal 108 to allow the transmission and reception to be performed by a predetermined high frequency band. As the predetermined high frequency band, for example, a 24 GHz frequency band is used.

Hereinafter, first, the transmission circuit unit 103 will be explained.

The transmission circuit unit 103 incorporates a mixer 112 and a switch 113. The mixer 112 multiplies the impulse signal 122 outputted from the pulse generating unit 111 by the carrier signal 108 outputted from the high frequency oscillator 107, so that the impulse signal 122 is up-converted into a predetermined frequency band. The up-converted impulse signal 122 is transmitted from the transmission antenna 104 to the outside. The transmission circuit unit 103 provides the switch 113 between the high frequency oscillator 107 and the mixer 112.

When the impulse signal 122 shown in FIG. 17 uses a wideband of 4 GHz or more in a 24 GHz frequency band, the pulse width 123 of the impulse signal 122 becomes approximately 500 ps. When such impulse signal 122 is transmitted at a frequency of 100 MHz or less, the time interval 124 between the impulse signals 122 becomes 10 ns or more. That is, the time during which the impulse signal 122 is not oscillated is several ten times long as compared with the time during which the impulse signal 122 is oscillated.

When the carrier signal 108 is leaked from the mixer 112 and is outputted from the transmission antenna 104, the carrier signal 108, which has leaked for a far long period as compared with a period during which the impulse signal 122 is transmitted, is outputted from the transmission antenna 104, and a part of the carrier signal is received by a reception antenna 106. As a result, there has been a problem that an original signal by which the impulse signal 122 is reflected and received ends up being masked by a signal by which the leaked carrier signal 108 is reflected and received.

Hence, the transmission circuit unit 103 is configured such that the switch 113 is provided between the high frequency oscillator 107 and the mixer 112, and only during the period when the impulse signal 122 is outputted, the switch 113 is closed, so that the carrier signal 108 is outputted to the mixer 112, and during a period when the impulse signal 122 is not outputted, the switch 113 is opened, so that the carrier signal 108 is not outputted to the mixer 112. Therefore, during a period when the impulse signal 122 is not outputted, it is possible to avoid the leakage of the carrier signal 108 to the mixer 112 and the subsequent transmission thereof from the transmission antenna 104.

Figure 18:
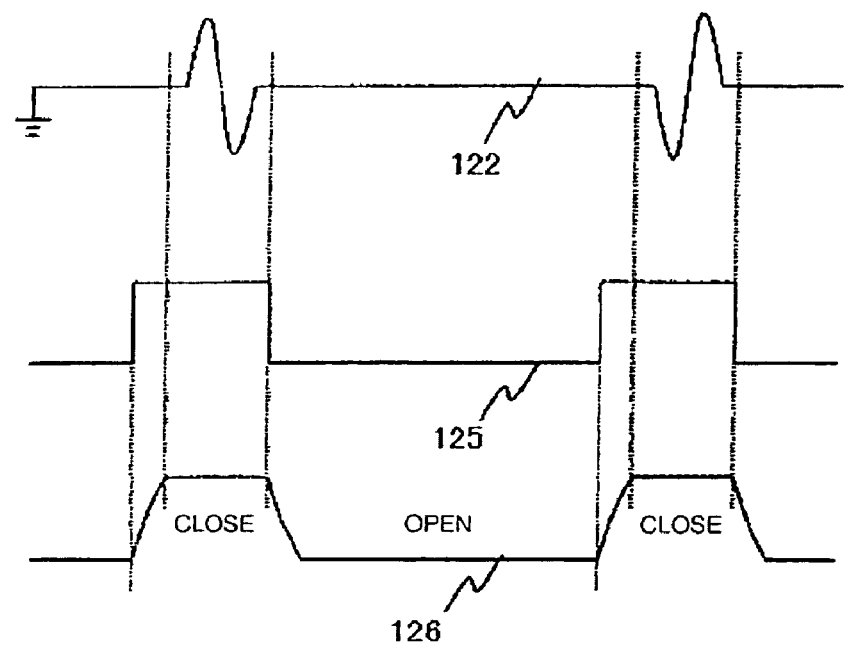
FIG. 18 shows one example each of an impulse signal, a control signal for opening and closing a switch, and a response of opening and closing operations of the switch.

The control signal 125 to open and close the switch 113 is prepared in conformity to the pulse pattern 121 supplied to the pulse generating unit 111 in the digital circuit unit 102, and is outputted to the switch 113. One embodiment of the control signal 125 to open and close the switch 113 and the responses of the opening and closing operations of the switch 113 will be shown in FIG. 18 by associating with the impulse signal 122 generated by the pulse generating unit 111. In FIG. 18, a graph 126 shows a ratio of the closed state of the switch 113 which opens and closes according to the control signal 125.

Figure 19:
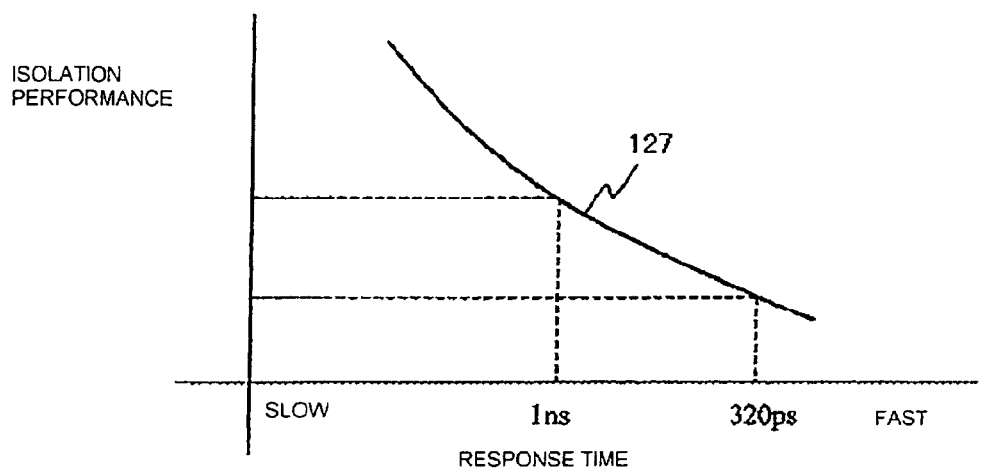
FIG. 19 shows one example of isolation characteristics of the switch.

The switch 113 is preferably sufficiently closed during a period when the impulse signal 122 is at least outputted. Consequently, in consideration of the responsiveness of the switch 113, the control signal 125 is preferably made into a step-like signal as shown in FIG. 18. One embodiment of the isolation characteristic of the switch 113 will be shown in FIG. 19. The isolation characteristic 127 of the switch 113 becomes high in isolation performance as the response time of the closing motion becomes long, and is reduced as the response time becomes short.

In the transmission circuit 103 used for the radar and the like, as explained above, it is important to avoid the leakage of the carrier signal 108. Consequently, higher the isolation performance of the switch 113 is, more preferable it is.

However, when the response time is made longer than necessary to enhance the isolation performance, the closing time of the switch 113 including a transition time increases in length to a large degree as compared with the pulse width of the impulse signal 122. As a result, from among the closing time of the switch 113, the time by which the impulse signal 122 is not outputted increases in length, and during that time, the carrier signal 108 is continuously outputted to the mixer 112, and the signal leaked from the mixer 112 and transmitted from the transmission antenna 104 causes a profound effect.

Hence, in the transmission circuit unit 103, by appropriately selecting the response time of the switch 113, the outputting of the carrier signal 108 to the mixer 112 is controlled. That is, for example, when the pulse width of the impulse signal 122 is 500 ps, the response time of the switch 113 is preferably set to approximately 1 to 3 ns. During such extent of the period, even when the carrier signal 108 is leaked from the mixer 112 and is transmitted from the transmission antenna 104, such extent of the leakage does not adversely affect the resolution of the radar.

If anything, by setting the response time of the switch 113 to the extent of 1 to 3 ns, an excellent effect can be obtained such that not only the isolation of the switch 113 can be enhanced, but also an inexpensive switch can be used.

Incidentally, in the present embodiment, while the switch 113 is provided between the high frequency oscillator 107 and the mixer 112, as another embodiment, it is possible to provide the switch 113 under stream of the mixer 112. During a period when the impulse signal 122 is not outputted, if the carrier signal 108 is prevented from leaking from the mixer 112, the installing position of the switch 113 is not limited to the above explained embodiment as far as the position does not adversely affect the waveform and the like of the impulse signal 122.

Next, an exemplary embodiment of the receiving circuit will be explained based on the drawings.

The signal transmitted from the transmission antenna 104 is reflected by a physical object such as a vehicle and a person, and is received by the receiving antenna 106. In the receiving circuit unit 105 of FIG. 16, a receiving signal 151 is sent to the IQ demodulator 131, and is returned to the baseband again by the I demodulator 131, and at the same time, is separated into an I component 152 and a Q component 153.

The IQ demodulator 131 branches the receiving signal 151 received by the receiving antenna 106 and inputs it into two mixers 132 and 133, while the carrier signal 108 from the high frequency oscillator 107 is inputted to the mixers 132 and 133, respectively, and the receiving signal 151 is down-converted again into a baseband. At this time, the mixer 133 is inputted with a phase of the carrier signal 108 shifted by $\pi/2$ by a phase adjusting unit 34.

As a result, the I component and the Q component of the receiving signal 151 caused by a phase shift can be separated and extracted by each of the mixers 132 and 133. The extracted I component and Q component are shaped by LPFs (Low Pass Filter) 135 and 136, respectively, and after that, are outputted from the IQ demodulator 131 as an I component 152 and an Q component 156.

The I component 152 outputted from the IQ demodulator 131 is branched, and is inputted to two AD converters 137 and 138, respectively, while the Q component 153 is branched, and is inputted to two AD converters 139 and 140.

In the embodiment of the receiving circuit 105 shown in FIG. 16, to accurately pick up a peak and a dip of the bipolar pulse, with one pair made from two AD converters, two pairs of four sets AD converters 137, 138, 139, and 140 are used. Although a peak and a dip of the bipolar pulse can be sampled by one set of the AD converter, to that end, it is necessary to use an AD capable of dealing with the 4 GHz frequency band. However, since the 4 GHz matching AD converter is expensive, there is a big problem in terms of the cost.

In contrast to this, similarly to the receiving circuit 105 of the present embodiment, by using two AD converters, a peak and a dip of the bipolar pulse is allowed to be sampled separately, thereby making it possible to use the AD converter capable of dealing with approximately 40 MHz and to reduce the cost to a large extent. The signal processing in the digital circuit 102 also can be promptly performed.

In the combination of two AD converters each, one combination of the AD converters 137 and 139 performs a sampling of the I component 152 and the Q component 153 by the timing 154 given from the digital circuit unit 102. In contrast to this, the other combination of AD converters 138 and 140 determines a timing which delays the timing 154 given from the digital circuit unit 102 by the above explained delayed time in the delay time setting units 141 and 142, respectively, and by the timing delayed by the above explained delay time, the I component 152 and the Q component 153 are sampled.

The impulse signal 122 generated and transmitted by the transmission circuit unit 103 of the present embodiment is fabricated by a clock of the digital circuit unit 102, and a time difference between a peak and a dip of the bipolar pulse which is the waveform of the impulse signal 122, that is, the delay time is equivalent to the clock cycle. Since the clock cycle is recorded by a digital value in the digital circuit unit 102, it is possible to accurately set the delay time to the delay time setting units 141 and 142. As a result, the delay time which has been difficult to realize conventionally can be accurately set by the delay time setting units 141 and 142 in the receiving circuit unit 105 of the present embodiment.

The timing 154 that performs a sampling of the I component 152 and the Q component 153 is set in the digital circuit unit 102 based on the predetermined time and every predetermined cycle T, and is outputted to the AD converters 137, 139 and the delay time setting units 141 and 142. The predetermined time can be taken as a timing by which the impulse signal 122 is transmitted from the transmission circuit 103.

The cycle T can be set constant to communication with the physical object at a predetermined distance, and can be made variable when the ranging is performed as a radar.

Assuming that the delay time is defined as τ1, the AD converters 138 and 140 perform a sampling by a timing delayed by the detail time τ1 from the timing 154 outputted from the digital circuit unit 102. The timing for sampling a peak and a dip of the bipolar pulse by the AD converters 137, 138, 139, and 140 will be schematically shown in FIG. 20.

Figure 20:
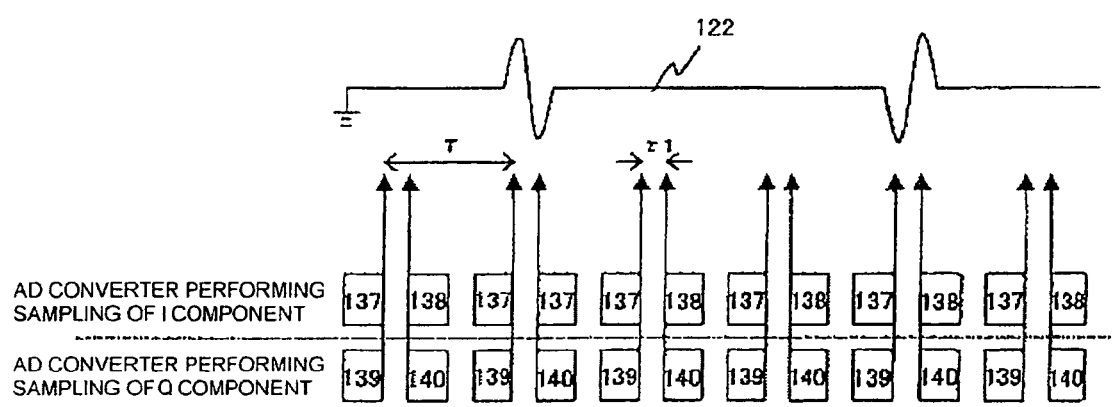
FIG. 20 schematically shows timing for sampling a peak and a dip of a bipolar pulse by an AD converter.

As shown in FIG. 20, for the I component 152, the peak before the bipolar pulse is sampled by the AD converter 137, and the peak behind the bipolar pulse is sampled by the AD converter 138. Likewise, for the Q component 153, the peak before the bipolar pulse is sampled by the AD converter 139, and the peak behind the bipolar pulse is sampled by the AD converter 140.

In the receiving circuit 105 shown in FIG. 16, to sample both a peak and a dip of the bipolar pulse, though two sets of the AD converters are made into a pair so as to perform the sampling, when the radar demodulation only is performed as the ranging purpose, one set of the AD converter can perform the sampling. That is, the radar demodulation only is performed, two peaks of the bipolar pulse are not necessarily picked up, but it only suffices to know that the impulse signal 22 has been received. When the radar demodulation only is performed, the transmission waveform is not necessarily a bipolar pulse, but may be a unipolar pulse.

To hold phase information on the receiving signal 151, in FIG. 16, the IQ demodulator 131 was used, but the IQ demodulator is not necessarily used, and particularly when the ranging only is performed for the radar purpose, the use of the IQ demodulator can be eliminated. When the IQ demodulator is not used, as a substitute for it, it is necessary to provide a mixer for down-converting the receiving signal 151 and the LPF. When the data demodulation is performed as the communication purpose, two sets of the AD converters are required, but when the radar demodulation only is performed, one set of the AD converter is allowed to be used.

In FIG. 16, the receiving circuit 105 is also provided with a switch 143. This is for the purpose of preventing the carrier signal 108 from leaking from the mixers 132 and 133 and giving an adverse effect to the sampling processing in some way or another except when the sampling of the receiving signal 151 is performed by the timing 154 given from the digital circuit 102.

Another embodiment of the receiving circuit will be explained below by using the drawings.

Figure 21:
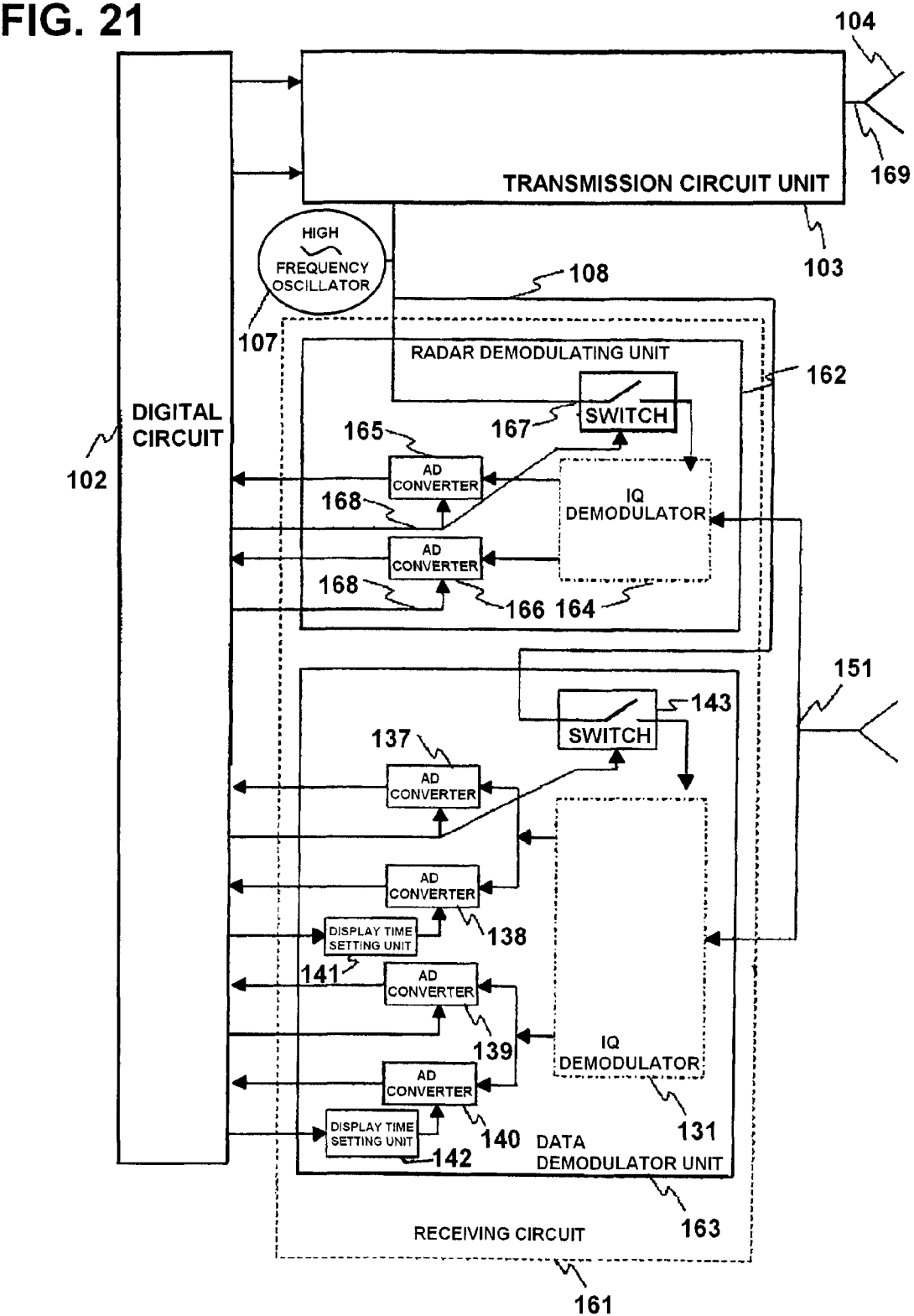
FIG. 21 is a schematic diagram showing a whole configuration of an example of the transmitter and receiver added with a radar demodulation unit.

In FIG. 21, the receiving circuit unit 105 of FIG. 16 is added with a radar demodulating unit 162 that processes the receiving signal 151 for the ranging purpose. The receiving circuit 105 shown in FIG. 16 is taken as a data demodulator unit 163 for communication in the present embodiment. Consequently, a receiving circuit 161 of the present embodiment includes the radar demodulating unit 162 and the data demodulating unit 163.

The radar demodulating unit 162 includes an IQ demodulator 164 and two AD converters 165 and 166. A switch 167 to shut off the input of the carrier signal 108 may be provided except when the receiving signal 151 is sampled. The AD converters 165 and 166 perform a sampling by a timing 168 given from a digital circuit unit 102.

In the radar transmitter and receiver for ranging, to measure the distance up to the physical object, a signal is transmitted from a transmission antenna, and by the time difference from when the signal is reflected by the physical object, and the reflected signal is received by the receiving antenna until it is sampled, the distance up to the physical object is measured.

Specifically, the time from when a transmission signal 169 is transmitted until it is sampled (sampling cycle) is sequentially changed by the predetermined time width τ2, while repeating transmission and reception, and determines a sampling cycle when the signal reflected by the physical object is detected.

In the present embodiment shown in FIG. 21, a signal transmitted from the transmission circuit unit 103 can be used for both ranging and communication. For example, the receiving signal 151 is processed in the radar demodulating unit, thereby detecting the physical object, and the sampling cycle when the physical object is detected is set to the sampling cycle of the data demodulation unit, so that the signal from the physical object can be received.

In the embodiment shown in FIG. 16, the receiving circuit 105 is used for ranging, and the sampling cycle T is sequentially changed so that the physical object is detected, and after the physical object is detected, the sampling cycle T is fixed, so that the communication with the physical object can be allowed to be performed. When the movement of the physical object is detected by the radar demodulation unit, the fixed cycle T is set again, thereby enabling the communication with the physical object to be continuously performed.

The present specification is based on Japanese Patent Application No. 2005-120111 filed on Apr. 18, 2005, Japanese Patent Application No. 2006-029245 filed on Feb. 7, 2006, and Japanese Patent Application No. 2006-111599 filed on Apr. 14, 2006. All of the content thereof is incorporated herein.

INDUSTRIAL APPLICABILITY

The present invention can be easily applied to a ranging and communication multifunction system that realizes a ranging function and a communication function at the same time.

The invention claimed is:

1. A ranging and communication multifunction system, comprising:
a signal generating device that generates a predetermined impulse signal, and modulates data by using a Pulse Position Modulation (PPM) impulse;
a carrier wave modulating device that up-converts the impulse signal by a predetermined carrier wave so as to generate a transmission signal;
a transmission antenna that transmits the transmission signal;
a receiving antenna that receives a signal in which the transmission signal is reflected by a physical object and arrives again;
an amplifying device that amplifies the receiving signal received by the receiving antenna;
a wave detecting device that detects an impulse signal from an output of the amplifying device; and
a receiving circuit that performs a predetermined processing by inputting the impulse signal detected by the wave detecting device, the receiving circuit including a ranging device and a communication device, the ranging device including an analog-to-digital converter and a plurality of range bins, the communication device including a high speed comparator and a digital-to-analog converter, the ranging device and the communication device being processed in parallel, wherein
an amplitude of the pulse signal detected by the wave detecting device is converted into a digital value by the analog-to-digital converter at every predetermined timing, is sampled to each of the range bins, and from among the sampling values of the range bins, a distance is calculated from the range bin which becomes a maximum, and the impulse signal detected by the wave detecting device is compared with the output of the digital-to-analog converter by the high speed comparator so as to be binarized, thereby performing data demodulation.

2. The ranging and communication multifunction system according to claim 1, wherein the signal generating device generates an ultra wideband baseband impulse of approximately 1 ns in pulse width.

3. The ranging and communication multifunction system according to claim 1, wherein the pulse repetition cycle of the impulse signal is larger than a total sum of the maximum delay time from among time slots for the PPM and the minimum pulse repetition cycle of the signal generating device, and the maximum delay time of the time slot is smaller than the minimum pulse repetition cycle.

4. The ranging and communication multifunction system according to claim 1, wherein the signal generating device generates a preamble signal comprising the predetermined number of pieces of impulse rows prior to modulating the data.

5. The ranging and communication multifunction system according to claim 1, wherein the analog-to-digital converter converts an amplitude of the impulse signal detected by the wave detecting device into a discrete multi-value data (multi-bit digital signal).

6. The ranging and communication multifunction system according to claim 1, wherein a sampling by the ranging device is started by delaying by a delay time by the PPM, and is performed by shifting a timing in increments of the predetermined time intervals (offset) decided so as to interpolate resolution of the amplitude data accumulated in the range bin.

7. The ranging and communication multifunction system according to claim 1, wherein the communication device starts the data demodulation based on the preamble signal.

8. The ranging and communication multifunction system according to claim 1, wherein the signal generating device makes two consecutive pulses into one pair and performs the data modulation for a second impulse.

9. The ranging and communication multifunction system according to claim 8, wherein a first pulse of the consecutive two pulses is a second impulse of the immediately preceding one pair of impulses or a pulse generated next to the second impulse.

10. The ranging and communication multifunction system according to claim 1, wherein the signal generating device generates the impulse signal, and at the same time, generates a trigger pulse so as to transmit them to the ranging device.

11. The ranging and communication multifunction system according to claim 1, wherein the communication device detects a reflected wave of the transmission signal based on the distance calculated by the ranging device, and performs the data demodulation by removing the reflected wave.

12. The ranging and communication multifunction system according to claim 1, wherein the communication device controls a threshold value of the high speed comparator so that the rising intervals of the output from the high speed comparator become appropriate.

* * * * *